(12) United States Patent
Alonzo et al.

(10) Patent No.: US 8,408,459 B1
(45) Date of Patent: Apr. 2, 2013

(54) 4PL SYSTEM AND METHOD

(75) Inventors: Bobbie Ann Alonzo, Irving, TX (US); Ruth Elizabeth Nuckols Cox, Sherman, TX (US); Steven W. Miller, Oro Valley, AZ (US); Rebecca Anne Broussard Rodriguez, Oro Valley, AZ (US)

(73) Assignee: Brightpoint, Inc., Plainfield, IN (US)

( * ) Notice: Subject to any disclaimer, the term of this patent is extended or adjusted under 35 U.S.C. 154(b) by 1439 days.

(21) Appl. No.: 11/306,889

(22) Filed: Jan. 13, 2006

Related U.S. Application Data

(60) Provisional application No. 60/593,447, filed on Jan. 14, 2005.

(51) Int. Cl.
*G06F 19/00* (2011.01)
(52) U.S. Cl. .................................... 235/385
(58) Field of Classification Search ............... 235/385; 705/25; 707/200
See application file for complete search history.

(56) References Cited

U.S. PATENT DOCUMENTS

| | | | |
|---|---|---|---|
| 5,155,860 A | 10/1992 | McClure | |
| 5,249,218 A | 9/1993 | Sainton | |
| 5,414,751 A | 5/1995 | Yamada | |
| 5,418,837 A | 5/1995 | Johansson et al. | |
| 5,926,756 A | 7/1999 | Piosenka et al. | |
| 5,930,703 A | 7/1999 | Cairns | |
| 5,974,311 A | 10/1999 | Lipsit | |
| 6,018,656 A | 1/2000 | Shirai | |
| 6,092,133 A | 7/2000 | Erola et al. | |
| 6,484,024 B1 | 11/2002 | Darnault et al. | |
| 6,487,403 B2 | 11/2002 | Carroll | |
| 6,701,431 B2 | 3/2004 | Subramanian et al. | |
| 6,748,209 B2 | 6/2004 | Lipsit | |
| 6,804,538 B2 | 10/2004 | Steinbach et al. | |
| 6,807,263 B2 | 10/2004 | Klble et al. | |
| 6,851,606 B2 | 2/2005 | Maenpaa et al. | |
| 6,873,842 B2 | 3/2005 | Elayda et al. | |
| 6,997,379 B2 | 2/2006 | Boyce et al. | |
| 7,110,751 B1 | 9/2006 | Overby | |
| 7,114,105 B2 | 9/2006 | Rao et al. | |
| 7,165,003 B2 | 1/2007 | Mok | |
| 7,245,904 B2 | 7/2007 | Miscopein et al. | |
| 8,175,899 B2* | 5/2012 | Becerra et al. ............ 705/4 |
| 2001/0034673 A1* | 10/2001 | Yang et al. ............ 705/28 |
| 2001/0041556 A1 | 11/2001 | Laursen et al. | |
| 2002/0147732 A1* | 10/2002 | Lee et al. ............ 707/200 |
| 2002/0178076 A1* | 11/2002 | Ross ............ 705/26 |
| 2003/0027581 A1 | 2/2003 | Jokinen et al. | |
| 2003/0061106 A1* | 3/2003 | Thomson et al. ............ 705/26 |
| 2003/0162533 A1 | 8/2003 | Moles et al. | |
| 2003/0233246 A1* | 12/2003 | Snapp et al. ............ 705/1 |
| 2004/0005910 A1 | 1/2004 | Tom | |
| 2004/0102217 A1 | 5/2004 | Kacines | |
| 2004/0116109 A1 | 6/2004 | Gibbs et al. | |
| 2004/0176133 A1 | 9/2004 | Lipsit | |
| 2005/0032511 A1 | 2/2005 | Malone et al. | |

(Continued)

OTHER PUBLICATIONS

International Search Report mailed on Aug. 29, 2008 for PCT/US07/75689.

*Primary Examiner* — Thien M Le
*Assistant Examiner* — Sonji Johnson
(74) *Attorney, Agent, or Firm* — Ice Miller LLP

(57) ABSTRACT

System and method for returns management using a fourth-party logistics integrator 201. The system comprises a set of methods for optimizing a reverse logistics system using a fourth-party logistics integrator 201 to manage the entire returns supply chain for various organizations, e.g. 211, 221, and 231. By operating a fourth-party logistics integrator 201 to manage multiple third-party logistics providers, a significant cost savings and efficiency can be created by tracking repair costs individually for serialized products.

40 Claims, 13 Drawing Sheets

U.S. PATENT DOCUMENTS

| | | |
|---|---|---|
| 2005/0075115 A1 | 4/2005 | Corneille et al. |
| 2005/0149757 A1 | 7/2005 | Corbett et al. |
| 2005/0183081 A1 | 8/2005 | Burdy et al. |
| 2005/0192816 A1* | 9/2005 | Wechsel .......................... 705/1 |
| 2006/0003755 A1 | 1/2006 | Kuo |
| 2006/0015864 A1 | 1/2006 | Kang |
| 2006/0052094 A1 | 3/2006 | Kawabe et al. |
| 2006/0149577 A1* | 7/2006 | Stashluk et al. ................. 705/1 |
| 2006/0293081 A1 | 12/2006 | Overby |
| 2006/0293774 A1 | 12/2006 | Drader et al. |
| 2007/0105538 A1 | 5/2007 | Hassan et al. |
| 2007/0106985 A1 | 5/2007 | Pan et al. |

* cited by examiner

4PL SYSTEM AND METHOD

CROSS-REFERENCE TO RELATED APPLICATION

This application claims the benefit of U.S. Ser. No. 60/593,447, filed Jan. 14, 2005.

BACKGROUND OF THE INVENTION

This invention relates to supply chain management, specifically returns management. As the Internet continues to grow and mature, more business is being conducted using Internet-based technology. Another business trend is to outsource. There are numerous reasons to outsource such as reducing costs, improving operations, bypassing inadequate internal abilities, improving service, increasing sales, and reducing inventory. One of the typical types of outsourcing involves third-party logistics (3PL) providers. 3PL providers have helped to fulfill outsourcing needs for some time by concentrating their expertise on a single aspect of logistic services such as shipping, returned product management, or repairing returned products. While 3PLs fulfill their single function adequately, the outsourcing of different aspects of the business to multiple 3PL providers can be difficult to manage and inefficient for the user of such 3PL services.

SUMMARY OF THE INVENTION

The present invention is directed to a fourth-party logistics (4PL) solution to reverse logistics management. A 4PL provider is an integrator that assembles and manages the resources, capabilities, and technology of its own organization and other organizations such as typical 3PL providers to design, build, and run comprehensive supply chain management solutions. Whereas the 3PLs target specific functions, 4PLs act as a single source supplier for a given company by leveraging the strengths of the 4PL provider to efficiently manage multiple 3PL providers and any other service or product suppliers for the client company. The 4PL provider manages the process, people and technology. The 4PL also provides visibility and integration. Because 4PLs work closely with 3PLs and other providers to manage the entire supply chain, the 4PL closely monitors the successes and failures of all aspects of the supply chain and determines whether there are ways to improve the operation of the supply chain. This is not typically accomplished with a company hiring multiple 3PLs to meet its individual needs because the company hiring the 3PLs is focused on its core business, which is not typically managing 3PLs. Without the dedicated attention to managing a multitude of 3PL providers, the efficiency gains realized by outsourcing to a single 4PL will not be realized.

One particular feature that is advantageous in one embodiment of the current invention, for example, is the tracking of repair costs on a per unit basis. Typical 3PL providers offer only an average or standard cost for handling each returned product type based on a manual comparison of the costs from several 3PL vendors. Because the 3PL vendor is typically used for all returns of such a product, there must be a major price fluctuation before a different 3PL vendor is used. With the new 4PL system of this invention, the processing cost for each 3PL vendor is an integrated part of the system. This allows each individual unit of the same product type to be sent to a different 3PL vendor if economics justify such a decision. Furthermore, such decisions are automatically made by the system based on pre-defined automated business rules. This ability to trace repair costs by individual units provides for significant cost savings over a conglomerate of 3PL systems or even a typical 4PL system.

The present invention can provide, in one embodiment, a fourth-party logistics (4PL) reverse logistics management system acting as a total business process management system for automating different business rules and controls used by returns processors and agents of a logistics integrator for a plurality of customers and makes and models, for automating inbound and outbound tracking at the order, order line, and serialized unit level, and for providing results, cost, and component visibility and service level and performance metrics through reports and client interfaces.

The system can include a return order and repair order status tracking module (RORST) for processing and tracking product return orders. The RORST processing can include inspecting the returned product according to an applicable set of inspection criteria selected from a database of inspection criteria sets to service a plurality of customers and product types with a plurality of processing rules. The processing rules of the RORST can include debit/credit rules for automatically applying appropriate debits or credits to return orders in the distribution and financial module. The system can also use inspection criteria entered on each item master's database entry to override the inspection criteria from the inspection criteria database. The item master entry is a specific entry for each combination of enterprise/make/model that can provide specific details about the processing of that specific make/model for a given enterprise. The RORST module can also maintain a status database by order, order line, and/or unit.

The system can further include a repair order module (ROM) in communication with the return order and repair order status module for facilitating repair and gathering and storing repair data. The ROM can maintain the repair data in a repair status database such that the repair data is searchable by order, order line and unit.

The system can further include a distribution and financial module (DFM) in communication with the RORST and the ROM for processing account entries for a plurality of customers according to a plurality of corresponding business rules. Such business rules can include debit/credit rules for automatically applying debits and credits to return orders. The DFM can also facilitate transaction processing for sales orders and invoicing; inventory management and accounting processes; and data that vary by customer and process. The transaction processing can be for a plurality of customers and reverse logistics processes. The DFM can further maintain sales order and inventory data such that the data is searchable by order, order line, and unit.

The system can include a data repository and reporting module (DRRM) to extract as well as consolidate and report transaction, metrics, and event data internally and externally to support process management, claims verification, and billing. The system can further include a logistics integrator to coordinate and operate the RORST, the ROM, and the DFM and DRRM.

The RORST can have sub-modules for sales order inquiry, return for credit, return for exchange, undeliverable/refused, return not shipped from customer, customer credit, price adjustment, return disposition, inventory receipt, return authorization order inquiry, electronic serial number inquiry, item inquiry, return authorization hold for credit validation, return to sender, repair order status tracking, and so on, or combinations thereof. The RORST can also function to record and update the status of returned product at the order, order line, and unit level. The ROM can have sub-modules for repair orders, capture of key repair information required by customers, repair order status and disposition data, and so on, or combinations thereof. The ROM can also create inventory transfer orders to the third-party repair vendor (3PL) which can include inventory updates. The ROM can also be used to perform inventory transfers. Additionally, the ROM can facilitate the tracking of status, parts consumption and cost data at the order, order line, and unit level.

The DFM can have sub-modules for sales order processing, inventory management (including inventory transfers), procurement, customer history, financial accounting, customer credit, price adjustments, and so on, or combinations thereof. Additionally, the DFM can perform various inquiries such as electronic serial number (ESN) inquiry, item inquiry, return authorization order inquiry, and so on. Throughout this invention where sub-modules are described in detail, additional modules can be added as the technical and/or business need arises. The use of additional modules to add new features requested by clients or managers is compatible with the current invention.

The DFM can be in communication with the RORST to send information selected from the following: created and updated item information, created and updated shipping information, sales order information, created and updated customer information, or a combination thereof. Additional information may be desired depending on the future customizations of the system required to meet the needs of specific clients. As connections between certain modules and/or sub-modules is described throughout this invention, a modification of the connection pathway for some purpose such as increasing software efficiency is compatible with and contemplated by the current invention.

The RORST can communicate with the ROM to create repair orders and update status and disposition data of returns. The ROM can be in communication with the DFM to create sales orders and line items. While certain data is described as being communicated between specific modules in this invention, modifying the type and manner of data that is communicated based on changed customer and/or management desires is compatible with and contemplated by the current invention.

The logistics integrator can coordinate the system based on a product serial number, a return order number, any other unique identifier, or some combination thereof. The logistics integrator is preferably a fourth-party logistics enterprise. The system can be based on a participant model comprising a hub and a plurality of enterprises. The enterprises can include sub-groups selected from buyer, seller, carrier, and so on, or a combination thereof.

In another embodiment, the invention provides a method of reverse logistics management for automating different business rules and controls used by processors and agents of a logistics integrator for a plurality of customers and makes and models for automating inbound and outbound tracking at the order, order line, and serialized unit level, and for providing results, cost and component visibility and service level and performance metrics through reports and client interfaces. The method can include: (a) operating a logistics integrator to maintain configuration and data of a reverse logistics management system; (b) creating automated business rules for determining the disposition of a repaired product and generating repaired device instructions; (c) creating a return order in the system based on a unique product identifier, such as a serial number or other relevant identifying information; (d) providing instructions to the returning party in accordance with the return order; (e) publishing the return order data and the repaired product instructions from the returns management system to a third-party logistics provider's database; (f) publishing sales order and item master data to a sales order database and a return and repair order status database; (g) receiving the returned product; (h) validating that the return contents match the return order data; (i) inspecting the returned product in accordance with inspection rules from the inspection criteria database or the item master entry; and (j) receiving status updates from the third-party logistics provider's database. The inspection rules can be provided from the RORST, a third-party, the ROM, a database of inspection criteria, the item master entry or a combination thereof. The inspection can include a comparison of the contents of the return received with applicable descriptions according to inspection rules and/or item master entries maintained in the system by the logistics integrator. The returns management method can include a fourth-party logistics enterprise as the logistics integrator.

The method can also include tracking the return orders, preferably by one or a combination of the following: (1) inspecting the return using provided inspection rules if applicable; (2) creating the repair order in the ROM; (3) publishing the repair order to the ROM; (4) entering actions performed on the return; (5) updating status or disposition of the repair order; (6) publishing the updated status or disposition of the repair order; (7) shipping the repair; (8) closing the repair order; and (9) updating inventory in the RORST. The repair order status or disposition updating can be manually performed, or automatically performed by the repair order module.

An optional component of the returns management method can include the steps of the returning party sending the returned product directly to the designated third-party logistics provider and the third-party logistics provider performing the services including validation and/or inspection. The third-logistics provider can also perform the repairs if necessary. The third-party logistics provider can then dispose of the product, such as, for example, by sending the product directly to the returning party, to the fourth-party logistics provider's inventory, or to some other appropriate location to minimize shipping and handling costs. This embodiment has enhanced economic efficiency. Another embodiment includes the returning party sending the returned product to the fourth-party logistics provider, the fourth-party logistics provider verifying that the product matches the return order and forwarding the returned product to the designated third-party logistics provider, wherein the designated third-party logistics provider returns the repaired product to the fourth-party logistics provider and the fourth-party logistics provider can send the product back to the customer. This embodiment can be desirable to facilitate control over the process. "Directly" as used in this context does not require an absolute direct from point A to B, but merely suggests that the product is shipped from point A to point B such that the shipping and handling steps are minimized and a cost savings results. It is within the scope of this invention for any of the services to be performed by either the fourth-party logistics integrator or any of the third-party logistics providers as the fourth-party logistics provider may desire.

The returns management system can include a return order and repair status tracking module (RORST) for processing and tracking the return orders, a repair order module (ROM) in communication with the RORST for facilitating the repair and gathering and storing repair data, and a distribution and financial module (DFM) in communication with the RORST and the ROM for facilitating the sales order and inventory data. Additionally, the system can include a data repository and reporting module (DRRM) in communication with one or more of the above modules to extract, consolidate, and report transaction metrics and event data internally and externally to support process management, claims verification, and billing. Preferably, the logistics integrator coordinates the system including the DRRM.

The return order creation can include one or more of the following in any combination: (1) receiving a request for a return; (2) searching for an associated sales order; (3) retrieving data from any associated sales order; (4) creating a return order for the requested return from a predefined template; (5) presenting any applicable descriptions and inspection rules from the returns management system that match a make and model of the requested return; (6) entering any specific return data; (7) saving the return order; and (8) confirming the return order. The request can be received from a source by e-mail, telephone, fax, electronic submission, personal presentation, receiving a return, mail, or a combination thereof. The associated sales order searching can be by a unique identifier, such as, for example, serial number, electronic serial number, sales order number, billable stamp, order, order line, unit or a combination thereof.

The return processing preferably includes one or more of the following in any combination: (1) selecting one of the return orders to process; (2) presenting applicable descriptions and inspection rules matching a make and model of the return; (3) entering applicable data regarding the return into the system; (4) sending information regarding action to take regarding the return; (5) taking action regarding the return according to the information sent; (6) creating a repair order for the return; (7) decrementing inventory utilizing the return order and repair order status module if applicable; (8) processing debit/credit information via the DFM; (9) transferring calculated debit/credit information from the RORST to the DFM; and (10) updating the inventory database via the DFM. The applicable data entered can include quantity received, reason, disposition, prior repairs, serial number, warranty status, customer warranty status, and so on, or a combination thereof. The information sent regarding action to take can include an alert to create a sales order for shipping and handling charges, serial number and return information to the DFM, an alert to create a debit memo in the DFM for restocking fee, an alert to perform price adjustment in the DFM, an alert to create a sales order in the DFM for exchanging the return, or a combination thereof. Credit/debit amounts are typically determined from pre-defined credit/debit rules configured for the enterprise. As the needs of management and/or customers change, new information can be sent between modules, and such new information can be compatible and consistent with the present invention. The electronic serial number can be updated via the DFM after the inventory is updated.

DESCRIPTION OF THE INVENTION

The present invention can be used to the advantage of services and industries that deal with supply chain management. In one embodiment, the present invention provides reverse logistics for supply chain management by providing for returns, inventory, and repairs management. The returns process is managed by determining if the return is valid and creating a return authorization (RA), giving credit (if applicable), and determining the disposition of returned items, for example, repair, return to stock, return to vendor or other third-party, or the like. The returned inventory is managed as either consigned or non-consigned inventory. Repair of returns is accomplished by repairing in-house, outsourcing repairs, or allowing an original equipment manufacturer (OEM) to repair the returned item. Each of these mentioned repair facilities can constitute a third-party logistics provider as discussed in the present invention. The returned item may belong to a customer, also referred to as the returning party, or the supply chain management. For illustrative purposes only, reverse logistics supply chain management of wireless handsets will be used throughout this description as an illustrative embodiment. While reverse logistics supply chain management for mobile phones is particularly advantageous and is described in detail below, other types of products can work equally as well. The current invention can provide the greatest cost savings where the product is serialized, although this is not a requirement in the broadest aspect of the invention.

Figure 1:
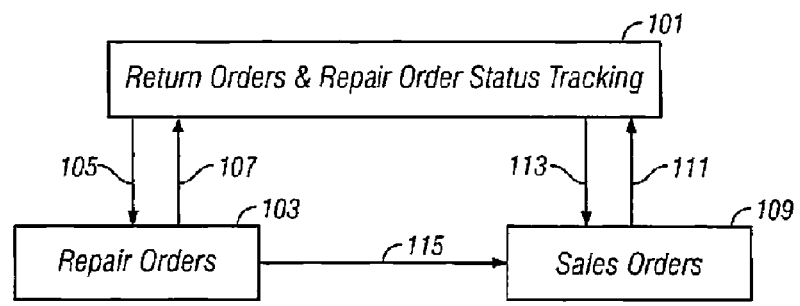
FIG. 1 is a schematic overview of one embodiment of the system and method of the invention.

The method and/or system of reverse logistics for supply chain management can utilize components for return order and repair order status tracking, repair order management, and distribution and financial management. The system can further utilize a data repository and reporting system. A general overview of reverse logistics for supply chain management is shown in FIG. 1.

The return orders and repair status tracking (RORST) component 101 can facilitate the creation of return and repair orders and processing. The RORST module can also control, process, track, record, and update the status of a returned product at the order, order line, and unit level. The order level refers to a specific order. The order line level refers to a line item from a specific order. The unit level refers to the individual unit level when products are serialized. The RORST component can contain sub-modules such as sales order inquiry, return for credit, return for exchange, undeliverable/refused, return not shipped from customer, customer credit, price adjustment, return disposition, inventory receipt, return authorization order inquiry, electronic serial number (ESN) inquiry, item inquiry, tracking number inquiry, return authorization hold for credit validation, return to sender, repair order status tracking, and the like. Additionally, the RORST is capable of performing inbound and outbound processing of returns as they are received and/or shipped out. An example of a suitable RORST component 101 is commercially available under the trade designation YANTRA 5X. While YANTRA 5X is a suitable implementation of the RORST described in the illustrative example of the current invention, any implementation, whether commercially available or custom-developed, that achieves the function of the RORST would work equally as well.

The repair order management (ROM) component 103 can facilitate repair orders, capture of key repair information required by customers, as well as detail repair order status and disposition data. Additionally, the ROM can also facilitate the tracking of status, parts consumption, and cost data at the order, order line, and unit level. This may also be referred to as the repair order module (ROM) throughout this invention. When the RORST component 101 creates a repair order 105 the return order is sent to the ROM component 103. When the ROM component 103 sends updated status and disposition information 107, it can send that information to the RORST component 101. Refurbishing or repairing of returns can either be done in-house, outsourced to a third-party, or by an OEM. Even though some of these are in-house organizations, each is considered a third-party logistics provider (3PL) in the scope of this invention whether in-house or outsourced. The ROM component 103 can also utilize specific failure or repair codes to organize repairs and trends. The ROM component 103 also preferably tracks material consumption. In the description and examples, the ROM module was custom-developed. The ROM module could also be implemented by other custom-developed software within the ordinary skill in the art or commercially available software consistent with the claimed invention.

The sales orders component 109 is preferably the system of record for general transactional information. The sales order component is also referred to as the sales order module (SOM) or the distribution and financial model (DFM) throughout this invention. Its functions can include sales order processing, inventory management, procurement, customer history, financial accounting, and so on. Additional functions can include facilitating transaction processing for sales orders, invoicing, inventory management, account processes, and other data that can vary depending on a specific customer's needs or the particular reverse logistics process being utilized. An example of a suitable sales orders component system is commercially available under the trade designation JD EDWARDS. While JD EDWARDS is a suitable implementation of the sales order component described in the current invention, any implementation, whether commercially available or custom-developed, that achieves the function of the DFM would work equally as well.

The sales orders component 109 can send information 111 to the RORST component 101, including created and updated item information, created and updated shipping information, sales orders, created and updated customer information, and so on. The sales orders component 109 can also receive information 113 including created and updated return order and line item information, serial number update information, item inquiries from the RORST component 101, and so on. The sales orders component 109 can also receive information 115 from the ROM component 103, including material issues such as consumed parts for repair, sales orders created, line items created, and the like.

The data repository and reporting module (DRRM) can serve as a data storage medium for the large amount of data this system can collect over time. The DRRM can serve to store the large quantities of collected data for use at a later time for various purposes. Such purposes can include data extraction, consolidation and reporting of various data based on specified search parameters, performance metrics of various returned products as well as the reverse logistics system itself. Event data can also be stored for both internal and external events to facilitate process management, claims verification, and billing. The DRRM can operate either internally to the given 4PL provider or can be outsourced to one or more external sources. Another alternative can include using an external data repository of a given customer to prevent redundant data storage.

The system described herein can provide a total business process management solution for managing reverse logistics. The system can provide controls for use by returns processors and agents. Processors and agents are the personnel that can typically operate the system and facilitate the performance of the reverse logistics services. The system can also provide automated inbound and outbound tracking at various levels including but not limited to the order, order line, and unit level. The system can also provide cost and component visibility through the use of systems applications, reports, and internet/intranet interfaces including HTML and/or XML interfaces provided over the internet or an intranet. The systems applications, reports, and internet interfaces all have their plain and ordinary meaning. The actual implementation of such analysis tools can be done in accordance with a particular company's standard procedures and desires. The actual implementation including the software utilized for development or the layout of any systems application, internet/intranet interface, or report is not critical to the current invention.

An example scenario for illustrative purposes only follows. Shipped sales orders from the sales order system 109 are downloaded into the RORST 101 as "Shipped" orders. A return order is then created in the RORST 101 either against an existing sales order or as a blind return with no corresponding sales order reference.

Both the customer service representative (CSR) and returns processing groups use the RORST 101 to create return orders. In the case where return line details are not known at the time the return is authorized, the CSR can create a return order in a "Draft" status with header information only.

At the receiving dock, users capture inbound shipment information via an "Inbound-Outbound" document such as the sender, number of boxes, and carrier tracking number. For "Invalid Returns," "Return to Sender" or "Out of Warranty" dispositions, this same document can be used to record outbound shipment information such as carrier tracking number and reason for return.

Return processing users can create return order line items if needed, identify and record receipts, identify missing components for the receipt, capture inspection metrics, and assign final dispositions to returns. In cases where credit is involved and needs to be assigned or re-validated, an alert can be raised to the CSR. The CSR can then modify the credit value.

Upon closure of receipt, if the disposition is "Out of Warranty" the system can decrement the RORST inventory and send an alert to the CSR to create a sales order for shipping and handling and/or repair charges depending on the customer's instructions and applicability. The system can also perform the charging of shipping and handling automatically based on pre-defined rules for the enterprise. The user uses the Inbound-Outbound document for the shipment of the item to the sender.

For other dispositions, the ESN and/or mobile identification number (MIN), inventory and debit/credit information (if applicable) can be published to the sales order component 109. If the order type is "Refused Shipment", an alert is sent to the CSR to create a debit memo in the sales order component 109 for any applicable restocking fees. Alternatively, or in conjunction with the alerts, the system can automatically charge any applicable fees using the pre-defined credit/debit rules for the given enterprise. If the disposition is "No Trouble Found", an alert is sent to the CSR to perform any applicable price adjustment in the sales order component 109. If returned items have a disposition of "Sent for Repair", a repair order is generated in the RORST, and repair order data published for ROM. Based on the disposition of the returned item(s), the user can be prompted to enter an identifier. For example, the system can require an identifier for "Send for Repair" or "Return to Vendor" disposition. An example of an identifier is the primary stock keeping unit number (SKU). The identifier is used as the item number on the RORST and ROM repair orders.

Detail repair order data can be initially captured either directly into ROM by users or from an external source (e.g., OEM, 3$^{rd}$ party repair vendor, or any other 3PL provider) into ROM. ROM forwards status and disposition information to the DFM. The RORST's basic event management functionality provides status visibility and alerts for conditions that need to be reviewed and potentially escalated to management.

If the disposition of the returned item is return to vendor (RTV) or need customer instructions (NCI), the inventory is not decremented from the RORST and the return remains in open status, i.e. awaiting customer or vendor instructions, until a final disposition for the return is assigned. Based on the disposition of the returned item(s), the user can be prompted to enter an identifier. The system can require an identifier for "Repair" or "RTV" dispositions. The identifier can be referenced on RTV/NCI reporting. Reporting by vendor or customer can be provided to identify and track all outstanding RTV and NCI dispositions that are pending final disposition.

For remaining dispositions, inventory can be decremented from the RORST. Remaining inventory control functions and transactions can be performed in the sales order component 109.

Automated inbound and outbound tracking enables the ability to quickly inquire by carrier tracking number whether a customer shipment has been received and if the shipment has been sent to returns processing or returned to the sender.

The ability to use identifiers such as SKU's to access information, based on customer, make, model, or other inspection criteria facilitates the decision to process a return as a kit or components, and the proper determination of return or stock category. This reduces the need for specialized knowledge in returns processing. It also reduces processing errors and subsequent correction steps. Throughput is increased and the inventory is properly valued and credited. For instance, partial credit can be given in the case of missing parts.

An alert can be sent for various activities or conditions that can have a financial impact such as the need for credit validation, restocking fees, price adjustments, and shipping and handling charges.

Inspection metrics can be captured to provide more information and visibility desired by both customers and management. Inspection reason codes can be entered for categories such as stock category assignment, partial/denied credit, partial/denied warranty, and returned to sender.

The inspection criteria of the present invention can simplify database management and provide a significant time savings over prior art systems. Prior art systems typically require that each enterprise/item combination have a unique inspection criteria entry. This inspection criterion is typically entered on the item master database entry for each specific enterprise/make/model combination and the appropriate date range. The item master is typically the lowest level on the hierarchy in the database. It contains the information specific to only that particular enterprise/make/model combination. The claimed invention can increase efficiency by using less detail than is required by the entry in the item master database entry and only uses the item master entry as an override when a specific make/model needs special attention.

The claimed invention can maintain a separate database of inspection criteria which is preferentially used for inspection criteria. When determining which inspection criteria to display for a given enterprise/make/model combination, the claimed invention can display the lowest level of the hierarchy of detail available as follows: 1) Inspection criteria override from the item master database entry based on a match on enterprise/make/model and date range; 2) Inspection criteria from the inspection criteria database table based on a match on enterprise/product class/product line/sub-category/make and date range; 3) Inspection criteria from the inspection criteria database table based on a match on enterprise/product class/product line/sub-category and date range; 4) Inspection criteria from the inspection criteria database table based on a match on enterprise/product class/product line and date range; and 5) Inspection criteria from the inspection criteria database table based on a match on enterprise/product class and date range.

In operation, the system can search for the lowest level of detail in the hierarchy and display that information. For example, if the inspection criteria table only contains entries for enterprise/product class/product line/sub-category and a date range, the lowest level in the hierarchy that contains all necessary information is level 3 above. Although the system can also display level 4 or 5 based on the information available in the example, level 3 is the lowest level of the hierarchy for which all information is available and thus level 3 can be used. Also, the item master entry can override any entries from the inspection criteria database if the item master inspection information is available.

In prior art systems, the inspection criteria for each individual make/model under a given enterprise must be entered separately. The same must be repeated for every other enterprise even if the other enterprises have mostly the same make/model products. This creates a very lengthy database entry and management process. The present invention can provide the option to simplify this process by allowing the entry of inspection criteria at any level of the inspection criteria database hierarchy. For example, an enterprise can choose to have all items inspected under the same criteria and the criteria can be entered once for the entire organization instead of on a per item basis. This represents the two extremes of minimum data entry (per enterprise) and maximum data entry (per item). The system can also accept inspection criteria that are in between the two extremes of the amount of data entered.

Table 1 depicts a typical database of inspection criteria for use in one embodiment of the claimed invention. Enterprise 1 below has the bare minimum amount of data entered and only has two possible options. If the seal is broken the item is categorized as product class B, and if the seal is not broken and the box is undamaged, then the product is categorized as product class A. For Enterprise 2, the criterion is more complicated. Enterprise 2 has different inspection criteria depending on which manufacturer makes the product. In some cases additional data may be entered such as the product line and sub-category. If more data are entered in the database of inspection criteria, then more information must be matched for the returned product to be appropriately classified.

TABLE 1

| Enterprise | Prod Class | Prod Line | Sub-Catg | Make | Start Date | End Date | Inspection Criteria |
|---|---|---|---|---|---|---|---|
| Enterprise 1 | A | DFLT | DFLT | DFLT | 01/04/04 | | Box seal unbroken and box is physically undamaged. |
| Enterprise 1 | B | DFLT | DFLT | DFLT | 01/04/04 | | Box seal is broken or box is physically damaged. |
| Enterprise 1 | E | DFLT | DFLT | DFLT | 01/04/04 | | None. Alert supervisor if appears to be new model. |
| Enterprise 2 | A | DFLT | DFLT | Manuf. 1 | 01/04/04 | | Handset must be in original box with all included accessories, packaging, manuals, etc. Original box must be without markings. Manufacturers date code is within 4 months of current date. "All Call" timer must be 90 minutes or less. Handset must be free of any customer caused damage. |
| Enterprise 2 | B | DFLT | DFLT | Manuf. 1 | 01/04/04 | | One or more of the following is not true: Handset in original box with all included accessories, packaging, manuals, etc. Original box is without markings. Manufacturers date code is within 4 months of current date. "All Call" timer is 90 minutes or less. Handset is free of any customer caused damage. |
| Enterprise 2 | A | DFLT | DFLT | Manuf. 2 | 01/04/04 | | Handset must be in original box with all included accessories, packaging, manuals, etc. Original box must be without markings. Manufacturers date code is within 4 months of current date. "All Call" timer must be 5 minutes or less. Handset must be free of any customer caused damage. |
| Enterprise 2 | B | DFLT | DFLT | Manuf. 2 | 01/04/04 | | One or more of the following is not true: Handset in original box with all included accessories, packaging, manuals, etc. Original box is without markings. Manufacturers date code is within 4 months of current date. "All Call" timer is 5 minutes or less. Handset is free of any customer caused damage. |
| Enterprise 2 | E | DFLT | DFLT | DFLT | 01/04/04 | | None. Alert supervisor if appears to be new model. |

Visibility in the returns management process is also improved. An example is that the status of a repair order can be seen, including reporting for returns that are waiting vendor or customer instructions for final disposition.

RORST preferably uses a participant model that defines the roles, responsibilities and the relationship of the organizations or enterprises participating in the supply chain process. An organization can be a subsidiary company or business unit, or business partners like carriers and vendors, or the like. Each organization is assigned one or many of the following roles, such as hub, enterprise, seller, buyer, carrier, or the like. The role defines the functions and transactions in the system available to the organization. The hub typically represents the entity hosting the RORST. The hub is typically the 4PL. The hub has the ability to configure other organizations and assign their roles. The hub also determines and configures installation-level rules. The hub can be assigned multiple roles, for example, hub, seller, and buyer. An enterprise represents an entity that defines a unique business process. Each hub can have one or more enterprises defined within or associated with it. Business rules, users and user groups, other organizations can be defined at this level as well. An enterprise can be an actual entity, or it can represent multiple entities that all follow the same business rules. An organization is assigned the buyer role when it purchases product from the enterprise or other organizations that are configured as sellers. Carrier can refer to two distinct types of entities in the context of this invention. There are wireless carriers that provide the mobile phone service and are also known as service providers. Wireless carriers can be a client of the 4PL and set up as an enterprise or within an enterprise. There are also shipping carriers. A shipping carrier can be an example of an entity that provides logistics services for an enterprise as a 3PL. The shipping carrier is typically a third-party provider of 3PL services for shipping out replacement and/or repaired units. Special services, such as Next Day Air, can be offered, depending on the carrier used and the service level required by the applicable business rules for the enterprise.

Figure 2:
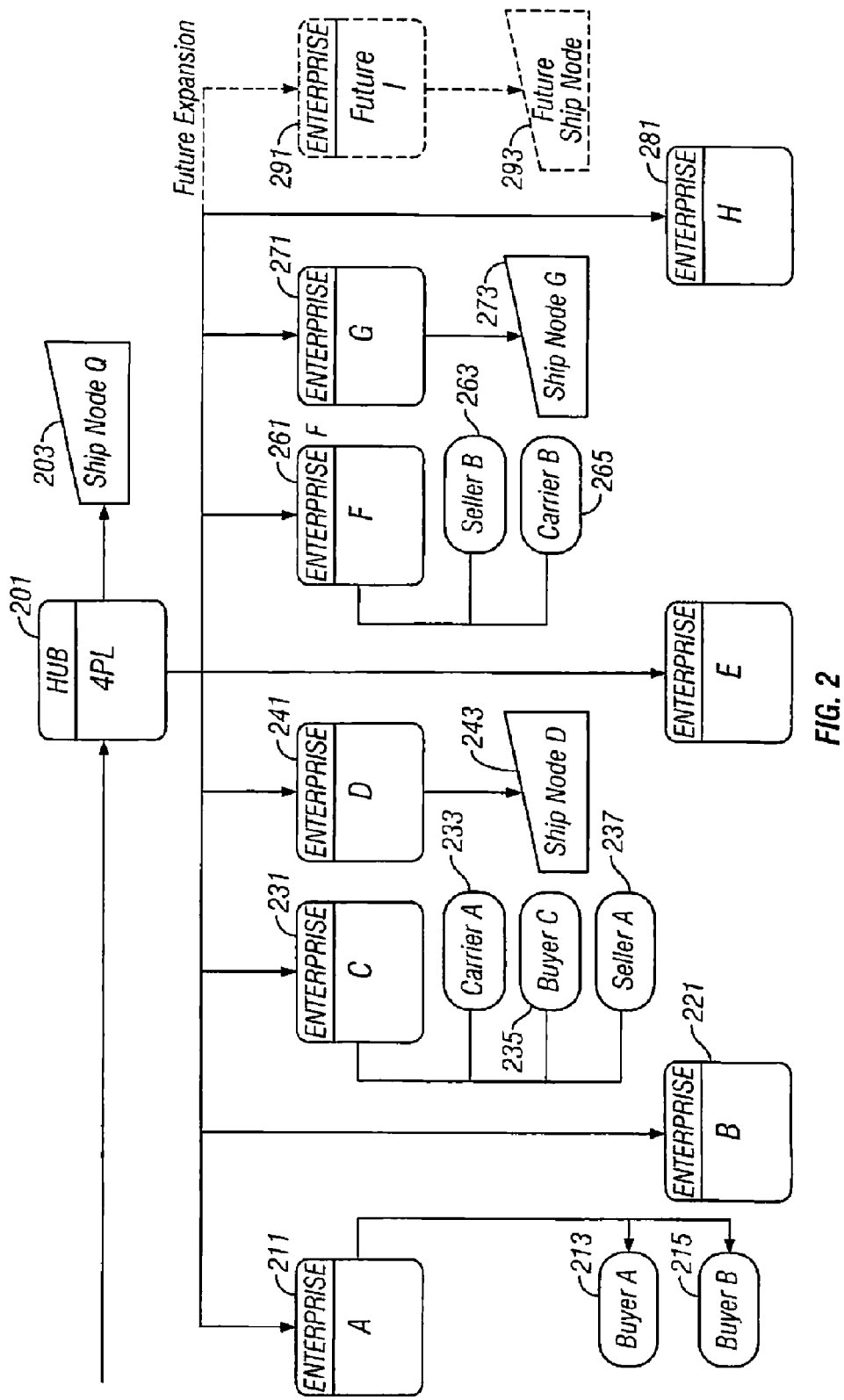
FIG. 2 is a schematic overview of a hub model according to another embodiment of the invention.

An illustrative example of the participant model is shown in FIG. 2. The starting point is the hub 201, which is the fourth-party logistics integrator in this example. The hub 201 has its own ship node Q 203. A ship node is typically an inventory storage location or system from where replacement products are dispatched when required. A strategic client subscribing to the reverse logistics services offered is typically set up as an organization with the role of enterprise. Several different enterprises are shown for example purposes and to clearly demonstrate that no two enterprises require the exact same services. The multiple enterprises shown also demonstrate that the participant model can have any number of enterprises. Each individual enterprise can represent a major client or organization of the 4PL, but more than one major client or organization can be in the same enterprise because the enterprise is typically divided based on organizations that follow the same set of business rules. Each client or organization is typically a Buyer, Seller, or Wireless Carrier in the case of wireless handset reverse logistics, although additional types of clients or organizations are possible for other types of products. For example, Enterprise A 211 comprises Buyer A 213 and Buyer B 215. Buyer A 213 and Buyer B 215 may have the same criteria for their repairs and returns and are thus classified under Enterprise A 211 even though Buyer A 213 and Buyer B 215 may be direct competitors. The typical distinction between two different enterprises can be addressed as a detail in the business rules that direct the manner in which returns are handled. All clients handled under the same set of business rules typically are associated with the same enterprise, although that is not a requirement in the present invention. As new strategic clients are added to this solution, they can be added as new enterprises 221, 231, 241, 251, 261, 271, 281, and 291. Each enterprise can represent a single client of the 4PL or multiple clients. Enterprises B 221, E 251, and H 281 each represent a client or organization without any sub-organizations. Enterprise C 231 has three clients associated with it: Carrier A 233, Buyer C 235, and Seller A 237. Enterprise D 241 has no additional clients or organizations, but does comprise ship node D 243 for Enterprise D 241. Enterprise G 271 is similar to Enterprise D, but with its own ship node G 273. The ship node D 243 dispatches replacement products for Enterprise D. An enterprise without its own ship node will typically utilize the ship node of the 4PL, ship node Q 203. Enterprise E in this depiction is actually an organization within the hub, although this is not a requirement of the invention. Enterprise E 251 is a dedicated organization for repairing returns that the 4PL hub 201 processes from its direct new product customers. This can be utilized where the 4PL is also a product seller. Enterprise E can function just as any other enterprise but can receive product from the customers of the 4PL hub 201. Enterprise E can also be utilized to handle end-consumers, and other ad-hoc buyers need not be set up as individual organizations in the participation model. Seller B 263 and Carrier B 265 are organizations within Enterprise F 261. Enterprise I 291 and ship node I 293 are merely placeholders to depict that any additional enterprises can be added whether they have multiple organizations, multiple ship nodes, multiple clients, or only a single client.

Each enterprise has its own set of business rules such as modification rules, order monitoring rules, common codes, credit/debit rules, inspection rules, reason code tables, and so on. As new logical rules are required, it is contemplated by the current invention to easily add new rules based on management and/or customer needs. For the initial implementation, each enterprise preferably uses the standard pipeline defined at the hub 201. If the business process of a given enterprise is significantly different from the process steps supported by the standard pipeline, a specific pipeline can be defined for that enterprise. Every enterprise is desirably administered by a user defined for the organization.

If an enterprise has a dedicated branch plant (ship node) in the sales order system, then a corresponding ship node can be configured under that given enterprise. Only branch plants related to the returns processing operations need to be configured as ship nodes in the RORST. If multiple clients share a particular branch plant, then that branch plant can be set up as a ship node such as ship node Q 203 at the hub 201 level. The default hub branch plant or ship node will typically be used by any enterprise which does not have an alternative ship node or branch plant configured.

The RORST can also use a catalog model. A catalog is an organization's collection set of items. These items are typically grouped into categories and sub-categories according to the customer's business practices. The catalog consolidation level for the RORST install can be defined as being at either the hub level or the enterprise level. If the catalog consolidation level is set to the hub level, items have to be uniquely identified across all organizations in the hub. If the catalog consolidation level is set to the enterprise level, each enterprise organization can define its own set of items.

An example enterprise-level catalog consolidation level ensures that each enterprise organization can have its own set of items and rules associated with those items. The sales order component can be the system of record for item master. These data are downloaded into the RORST periodically and/or immediately upon entry (real-time updates). Users can create and maintain kit definitions and other returns processing-related item attributes like "Receive as Components" in the RORST.

Another model used is the inventory and distribution model. The inventory consolidation level defines whether the total inventory will be segmented by enterprise or consolidated at the highest level (hub level). If the consolidation is set to the hub-level, then an item must have the same unique item ID across all enterprises in order for the inventory quantities available in all locations to be recognized as pertaining to the same item. If the inventory consolidation level is set to the enterprise-level, then the inventory for an item belongs exclusively to an enterprise and cannot be shared "globally" by other enterprises.

An example inventory consolidation model uses the enterprise level. Since each client is an enterprise, this model protects one customer's inventory from another. The RORST provides inventory visibility at the ship node level (branch plant level). Each enterprise maintains and tracks inventory. All ship nodes are set up to track inventory. For enterprises sharing the common ship node at the hub level, a distribution rule is defined to associate the ship node at hub level to the enterprise. Therefore, these enterprises also have a "seller" role.

Security can also be an important aspect of the system. The following types of user groups (roles) can be set up: customer service representative (CSR), receiving, returns processing, supervisor, administrator, general, and so on. Each of these user groups has permission to the appropriate resources as required by their job definitions. Each user is assigned a unique user ID.

One embodiment has all users belonging to the "Default" organization. This is so that every user involved with returns execution can access transactions belonging to all enterprises. If there is a future need to restrict a user's access to a specific enterprise, then the user's organization is changed to the specific enterprise. Only the administrative users have access to the RORST. The administrative users belong to the "Default" organization and manage and administer all aspects of configuration for all enterprises. Certain categories of users can only view data but cannot execute or modify it. These users belong to the general user group and have view or read permissions only. All user IDs, user groups and permissions should be defined manually through the RORST.

Another important aspect of the present invention is alert management. Generically, the alert management of the RORST is set up to notify users when exceptions are raised by the system. An exception is a message about a transaction that needs a manual intervention. An exception can be directed to a specific user or an exception queue. If it is assigned to a user, only that user can act upon it. If it is assigned to a queue, then all users subscribing to the queue are able to view it. Exception queues are set up to distribute exceptions to users. The administrator subscribes the users to the queues. The administrator can also set up exception priority and actions raised when certain conditions are met for the exception. The administrator can configure unresolved exceptions to be escalated to a different queue after a specified number of unresolved exceptions are reached. The administrator can configure exceptions that have not been assigned to a user to be escalated to another queue and/or raise an action after a given amount of time passes. The administrator can also configure unresolved exceptions to be escalated to another queue and/or raise an action after a given amount of time passes.

An illustrative example of the alert management model follows. CSR users and administrators have been identified for receiving alerts. A new user category is established for repair order management. Three queues are identified. These are for the CSR group, administrator group and repair order management group. The queues are further defined on the basis of an enterprise. All CSRs can belong to the CSR queue. Any system-related alerts, for example integration error, are preferably raised to the administrator's queue.

All alerts can be raised to a queue and not to a specific user. Initially, a supervisor user can distribute and assign an alert to a specific user for resolution. The assigned user marks the exception as resolved on completion of that task. The user can also un-assign the exception so that it returns to the general pool to be reassigned to another user.

Figure 3A:
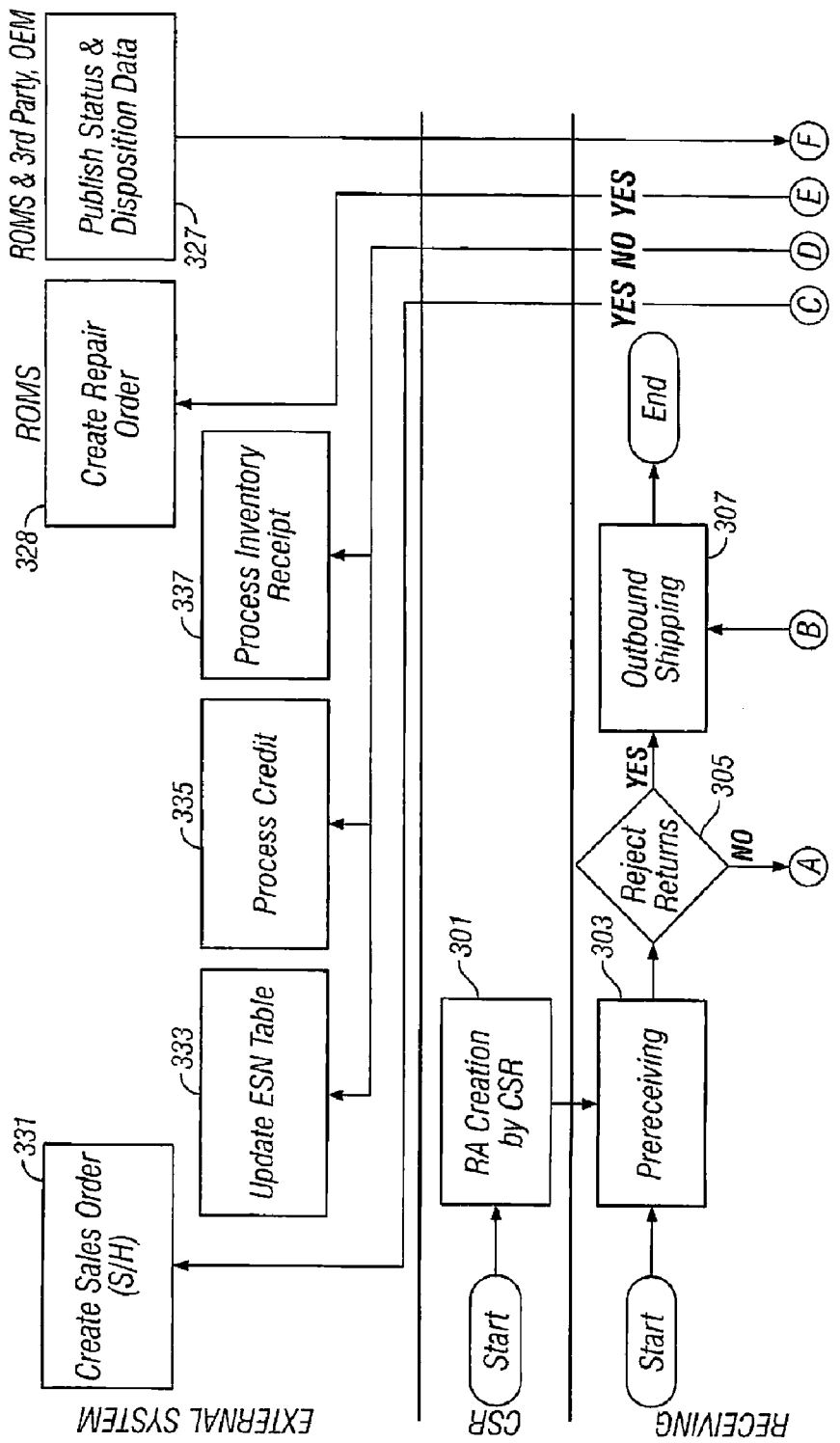
FIGS. 3A and 3B are a flowchart of a returns management process in an embodiment of the invention.
Figure 3B:
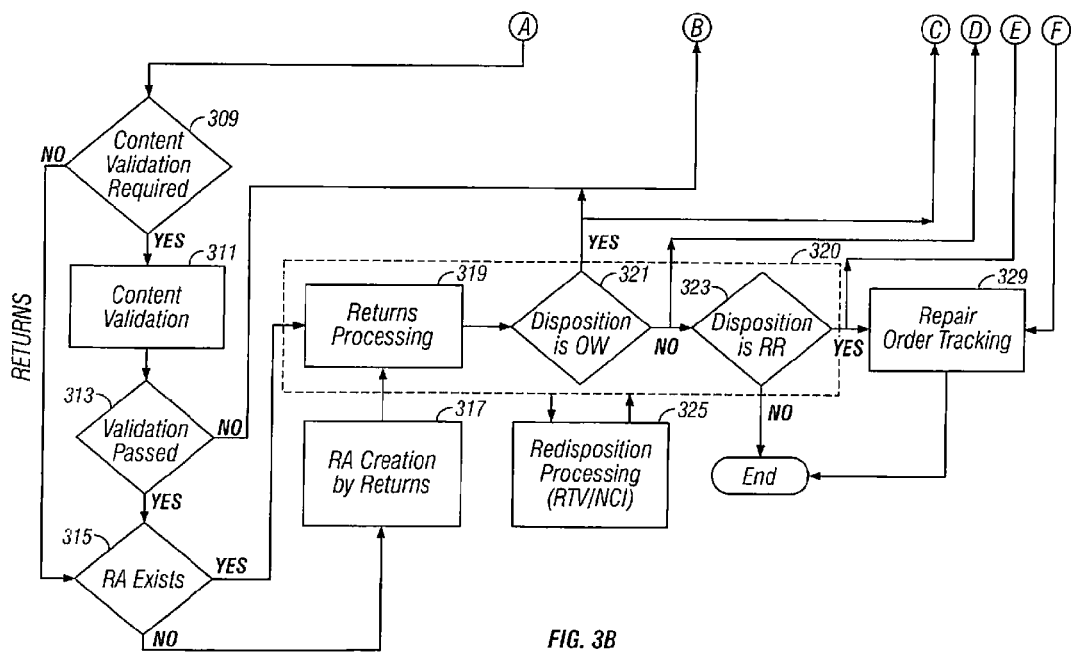

FIGS. 3A and 3B show an example of a returns management business flow diagram. A CSR or a returns processor creates a return authorization (RA) 301 on receiving a request for return authorization from the customer. The user at the receiving dock records the receipt of all packages at prereceiving 303. Each individual return can then be inspected to make sure that the return is valid, e.g., to see if the applicable return authorization instructions were properly followed. This can be a minimal validation process without actually opening the shipping box and verifying the contents. The inspection can be by any feasible means including visual, computerized machine vision, or some other automated system. Based on the inspection, each received order is passed or rejected at step 305. If the return is not valid, step 305 diverts the return to outbound shipping where it is returned to its sender. The user and/or automated system ships "Invalid Returns" from the system and records shipping details such as ship-to and tracking number in the system. If the return is rejected, it will be sent to be returned to the sender at outbound shipping 307. If the return is not rejected, step 305 can divert the return to a more rigorous content validation determination at step 309 if required by the applicable rules.

For returns requiring contents validation 309, the contents can be manually validated against an RA in the system or against the packing slip in the box. For a given make, model and enterprise, the system preferably displays the inspection rule by retrieving the inspection rule associated with the item, or if it does not exist, then retrieving the inspection rule according to the prioritized hierarchy of given item category, given product class, and given enterprise (strategic customer), as needed until the rule is found. This can typically be done by scanning or entering the handset ESN and/or MIN, the return authorization number, or similar identifying information.

Step 309 determines whether the contents of the return must be validated based on the RA number or other identifying information. If content validation is necessary, the content validation determinative step 309 can divert the return to a content validation step 311. The content validation step can vary but may include verifying that the proper products were returned. Specifically in the case of the wireless industry, the content validation step 311 can verify the mobile phone model, Mobile Identification Number (MIN) and/or Electronic Identification Number (EIN), whether mobile phone accessories are included when required, and so on. The content validation step can compare the received items to the items associated with the RA number or other identifier. Alternatively the contents can be listed on a packing slip for certain strategic customers. Contents validation step 311 can be performed and the results recorded in the system where applicable. If the return fails the content validation step 311, the validation passed determinative step 313 can divert the return to outbound shipping 307 for return to the sender. If the return passes the content validation step 311, the validation passed determinative step 313 can send the return to determine whether the return authorization exists in the system or not at 315.

If the return authorization exists, step 317 is bypassed and the system proceeds directly to step 319 for returns processing. If the return authorization does not exist, the system proceeds to step 317 where the return authorization is created by the returns processor. The returns processor can be an automated system or a person who manually enters the data into the system. The returns processor creates a return authorization in step 317, for example, when the customer has refused to accept a shipment, or for special circumstances such as customer programs where a return is authorized based on a billable stamp or accepted based on pre-approved return labeling. In step 319, the returns processor identifies the appropriate SKU/stock type based on make, model, ESN, and/or MIN, and customer program specific inspection rules for the returned item. The returns processor in step 319 receives the returned items in the system, captures ESN, records inspection metrics, and assigns a disposition. Following process receipt action 319, if the disposition of the returned item is out of warranty (OW) in step 321, inventory is decremented from the RORST and an alert is sent to customer service (CS) to create a sales order in step 331. Alternatively, or in conjunction with the alerts, the system can automatically generate sales orders based on pre-defined business rules for the enterprise. The sales order can vary depending on the business rules. In one example, the customer is contacted to determine if the customer is willing to pay for repairs which will change the status from out of warranty (OW) to return/repair (RR). This disposition can be changed based on updated information or re-examination in the redisposition processing step 325. If the disposition remains out of warranty, the system proceeds to the "create sales order" step 331 for either repair of the product or return shipping and handling charges if applicable. The product can stay in the overall returns processing system 320 while the sales order is created at 331. If the customer chooses to pay for the repairs of an out of warranty product, the system can change the disposition to repair or refurbish (RR) at step 331 when the sales order is created. If the product is still considered out of warranty after step 331, it will be sent to the outbound shipping step 307 for return to the customer. For other conditions, the RORST sends serial numbers and return order data to the sales order system for ESN updating 333, credit processing 335, and inventory receipt processing 337. If the disposition is Return to Vendor (RTV) or Needs Customer Instructions (NCI), the returns processor processes the redisposition in step 325. The return status remains as waiting vendor instructions or need customer instructions until a final disposition (other than RTV or NCI) is assigned. Inventory is decremented from the RORST for items with disposition of RR in step 323, a repair order is generated in the RORST, and repair order data are published for ROMS in step 328. If the disposition of the item is Return to Vendor or Send to Repair, the user is typically prompted to enter a primary SKU. The primary SKU can conveniently be used as the item number on the RORST and ROMS repair orders. For other dispositions, inventory can be decremented from RORST. Repair order status and disposition information can be aggregated by ROMS and published to RORST in action 327. The repair order is tracked in the system in step 329.

Figure 4:
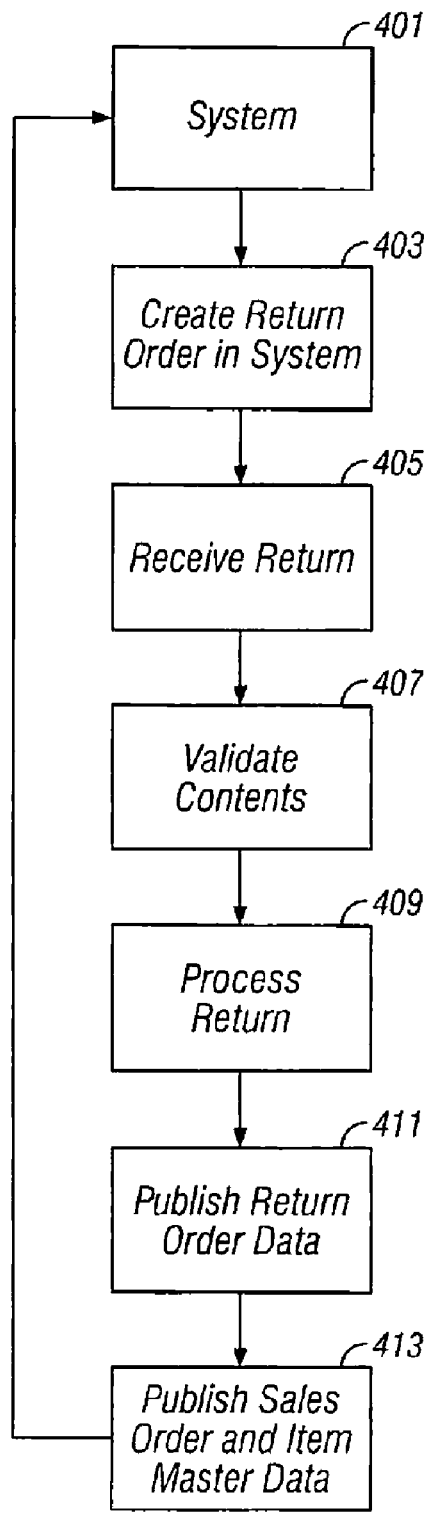
FIG. 4 is a flowchart of a method used to manage returns in an embodiment of the invention.

An illustrative example of managing returns in a logistics integration scheme is provided in FIG. 4. The overall system 401 can be the backbone of the method. The system 401 can require maintenance and configuration from the logistics integration personnel. This includes creating and maintaining databases, or equivalents thereof, of the products that the managed entity sells, repairs, or purchases. Relevant data can include but are not limited to serial numbers, warranty information, repair information, part listing, known problems and solutions, account numbers, client information, kit information, instruction sets, credit/debit rules, and so on. Maintenance can be done as often as needed to reasonably insure up-to-date data to keep costs down and maximize customer satisfaction.

Figure 5:
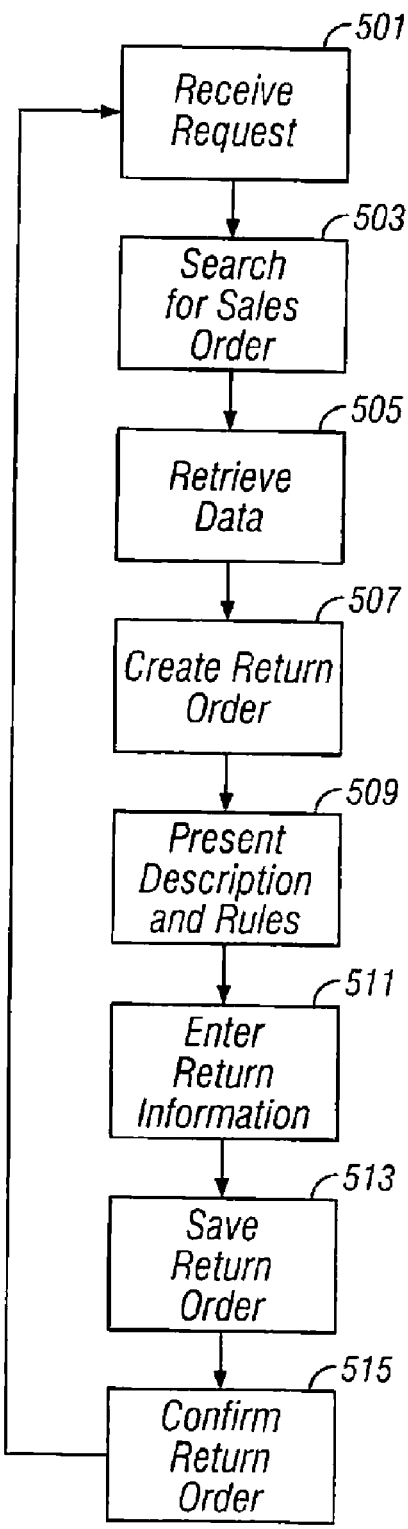
FIG. 5 is a flowchart for the creation of a return order in an embodiment of the invention.

With the system 401 in place, the first task is return order creation 403 in the system. FIG. 5 (discussed below) shows in more detail how this task is performed. Return orders or return authorizations are generated by a CSR or by the system 401 in response to an action. Such actions can include but are not limited to a third-party entering a request for a return (via telephone, email, mail, in person, fax, internet, etc.), an internal request for a return (as in the case of a recall), or the like. A third-party can make a request, for example, by submitting an online application such as using an online form in a web browser built using conventional e-commerce type technologies.

In this example, return receipt 405 occurs after a return order is created in the system 401. There are many ways to receive a return, including for example, a customer physically bringing in a return, a return shipped in, and a return picked up. Upon receipt of the return, the contents of the return are validated in task 407. A return can be validated manually or through an automated process. Both validation processes require the system 401 to provide information regarding the return that is compared to the return received. Information needed depends upon the customer's needs and business and can include but is not limited to serial numbers, account numbers, kit information, warranty information, other identifiers of the product, and so on. If the validation is not successful the return is typically sent back to the owner or other source.

Upon successful validation, the return is processed in step 409. A more detailed description of processing the return is found in FIG. 6. An example of basic processing includes determining if the product can be economically repaired, and if so determining who will repair it in the most economical manner, then actually repairing and/or refurbishing the product, and finally shipping the product. Repairing and/or refurbishing can be done by the in-house 3PL or other third-party 3PL repair providers. If the product cannot be repaired, the user determines what course of action to pursue based upon templates and data in the system. Or if the product is out-of-warranty, the user is prompted to take appropriate action according to the enterprise's instructions. There is not a set process for all returns as each enterprise has different requirements and needs. It is desirable for the logistics integrator and enterprise to work together to configure the system to have as many possible solutions to return problems as possible to cut down on costs, delays, and frustrations.

After the return processing 409, the return order data can be published to the system in publication step 411. The system configuration determines what data need to go to which component of the system. A generic example is a return that cannot be repaired to the standards of the applicable enterprise economically. Once the return has been processed and cannot be economically repaired, the system will implement the procedures to follow for the product provided by the respective enterprise. Typical remedies can include giving credit, sending a refurbished product, sending a new product, sending a substitute, returning to vendor, doing nothing, and so on. Regardless of the remedy, the result is published to the system. The system database can also be updated to capture the nature of the problem to facilitate the tracking of recurrent problems by the enterprise. After the action publication, the system can be updated in step 413 to reflect details such as inventory changes if another product is dispatched, updated customer account information if a credit was previously issued, and so on. The entire process is desirably fully integrated into the business of the enterprise to efficiently and cost-effectively meet the needs of the enterprise.

An illustrative example of a method for generating a return order is seen in FIG. 5. Return order creation begins with receiving a request for a return in step 501, in a manner earlier described. The system databases are then searched for relevant sales orders in search 503. An example of a way to search for sales orders is by using pre-determined fields to selectively narrow the database files, such as, for example, serial number, sales order number, customer identification, billable stamp, and so on, or any combination thereof. Search techniques for databases are well known in the art. If a representative sales order is present in the system, the data are retrieved in task 505. Return order creation 507 preferably uses predefined templates based on the data retrieved. Depending upon enterprise needs, return orders can be created manually or semi-automatically by a customer service representative, or automatically by the system. After a return order has been created, task 509 presents product descriptions and inspection rules to facilitate the validation process. These descriptions and inspection rules can be tailored to each product that is covered by the system. Specific data about the return can then be gathered in return information entry 511. Relevant data include expected return date, credit amount, and the like. The next step in this example is return order save task 513 to create a record in the system that can be accessed at a later point. Finally, the return order confirmation 515 notifies the return requestor of the return order and appropriate details.

Figure 6:
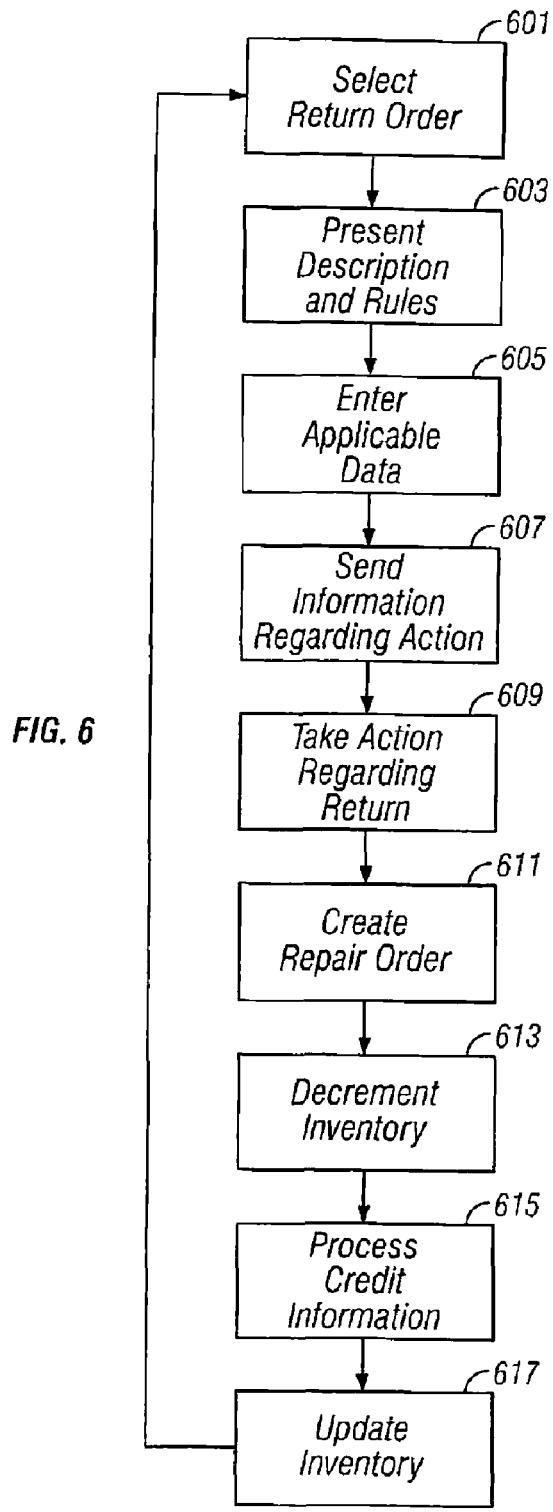
FIG. 6 is a flowchart for the processing of a return order in an embodiment of the invention.

An example of processing the return is illustrated in FIG. 6. After selecting a return order from the system to process in step 601, the system provides applicable descriptions and inspection rules for the return 603. Information regarding the return is supplied to the system at data entry step 605. Applicable data include but are not limited to customer identification, return issue, solution to be taken, return data such as serial or model number of the returned product, and so on. This information is then sent to the appropriate aspect of the system depending upon enterprise configuration in information send task 607. The proper action 609 regarding the return is then undertaken. This can include, for example, shipping the return back to the requestor or manufacturer, repairing the product, repairing the product in-house, having a third-party repair the product, shipping a new product, shipping a refurbished product, shipping a substitute product, issuing credit, or the like. If the action 609 is to repair the return, the next step in the process is repair order creation 611 as previously discussed above. The inventory decrement step 613 records the inventory change in the system if needed, for example, when the customer is to receive a replacement product, typically effected using the return order and repair order status module (RORST). Where a credit is to be issued, for example, customer credit with the enterprise, enterprise credit with the manufacturer, or the like, credit information is processed in step 615. Finally, the inventory records must be changed in inventory updating step 617 if the return is to be kept by the enterprise, preferably using the distribution and financial module.

Figure 7:
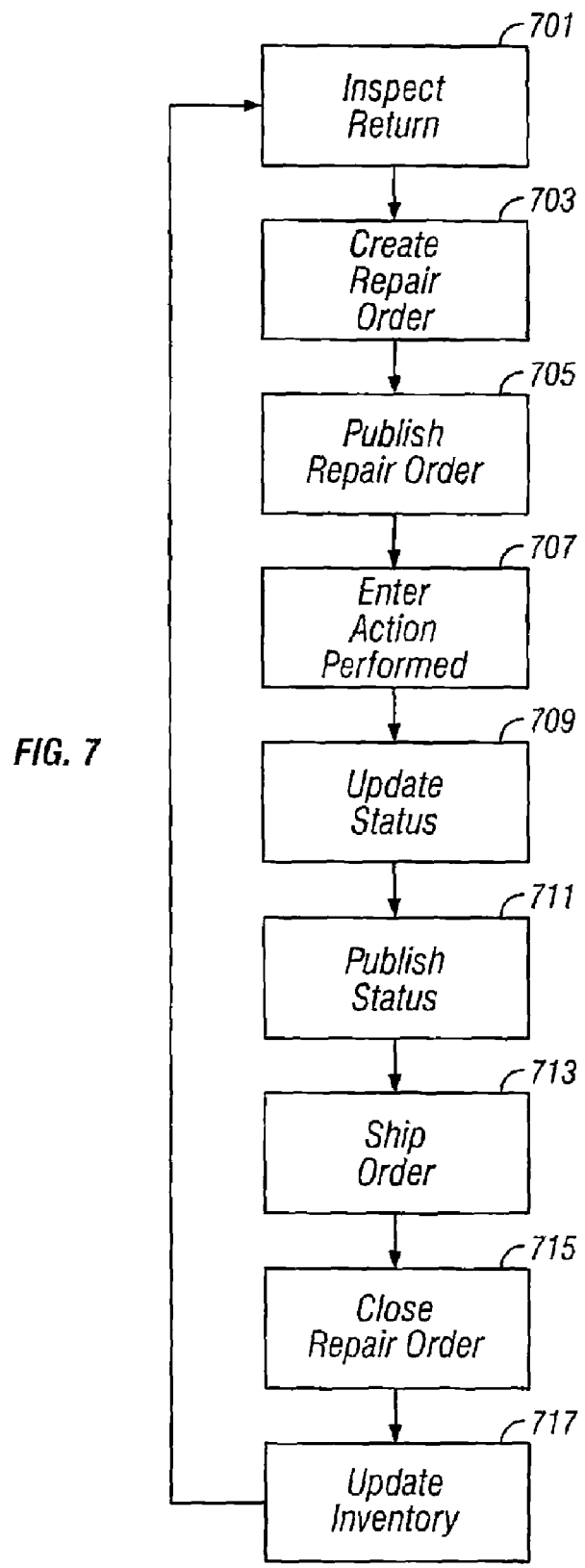
FIG. 7 is a flow chart for the process used in tracking of a repair order in an embodiment of the invention.

An illustrative example of a method of tracking a repair order is shown in FIG. 7. In this example, repair order tracking begins with return inspection 701, in accordance with any inspection rules provided by the system, typically enterprise specific. Then, repair order creation 703, and repair order publication 705 generates a record in the system of the order and provides an identification number to track. After the order publication 705, the user enters the action performed on the return at 707. The action performed data is then used in the repair status updating 709 and publication 711 to the system. Special note is made if an OEM or another third-party ships the return to the customer or a replacement product to meet the needs of the customer. Otherwise, the repair should be shipped back to the owner in step 713. The process is concluded with repair order closure 715 and the inventory updating 717 as needed. The repair is typically only sent to the owner if it is customer owned equipment (COE). Otherwise, the units can be kept as refurbished units to replace units being sent in for repair.

FIGS. 8A through 8D depict a Petri net diagram of one preferred embodiment of the invention. Petri nets are commonly used state diagrams in the development of business methods and software. FIGS. 8A through 8D depict several transitions denoted by the rectangular boxes and several states depicted by the circular structures. A transition represents a procedure or step for moving the system from the prior state to the next state. The lines connecting one or more transitions and/or places represent the passing of a token such that the next transition or place can determine the appropriate action. In this Petri net diagram, there are 7 tokens that can be created and/or passed. The possible tokens are Q, C, S, R, J, U, and I. While not absolute, these tokens can loosely represent Request, Claim, Sales Order, Return, Jiffy Pack, Unit, and Information respectively. These are arbitrary labels, but they loosely represent the portion of the business being carried out. Additionally, on the transitions or places that can pass a token to more than one other transition or place, there are small numbers all less than 100 that are next to the arrows to represent the approximate percentage of time that the token is passed on each route in this example.

Figure 8A:
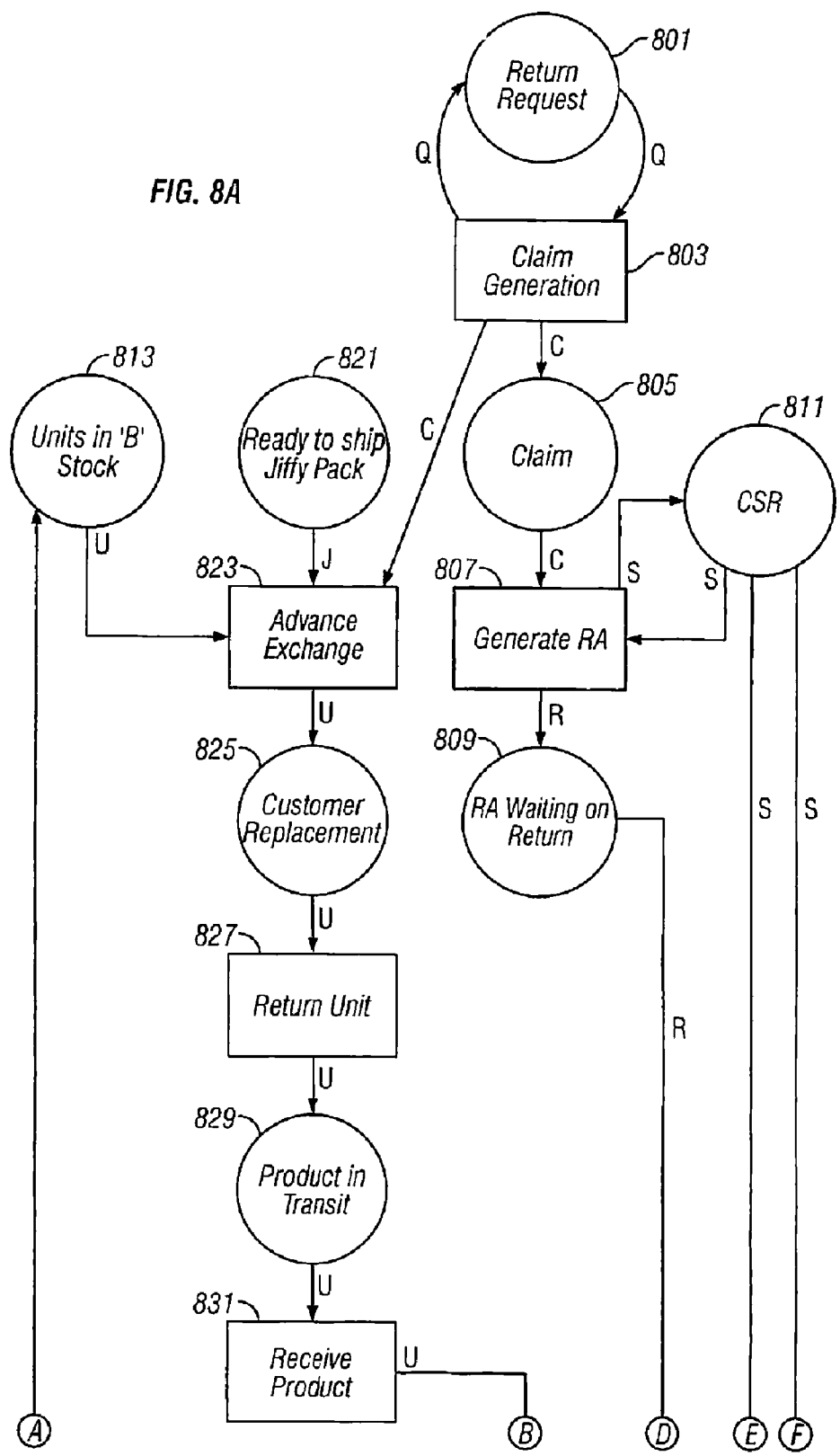
FIGS. 8A through 8D are a Petri net diagram of one embodiment of the reverse logistics system of the invention.
Figure 8B:
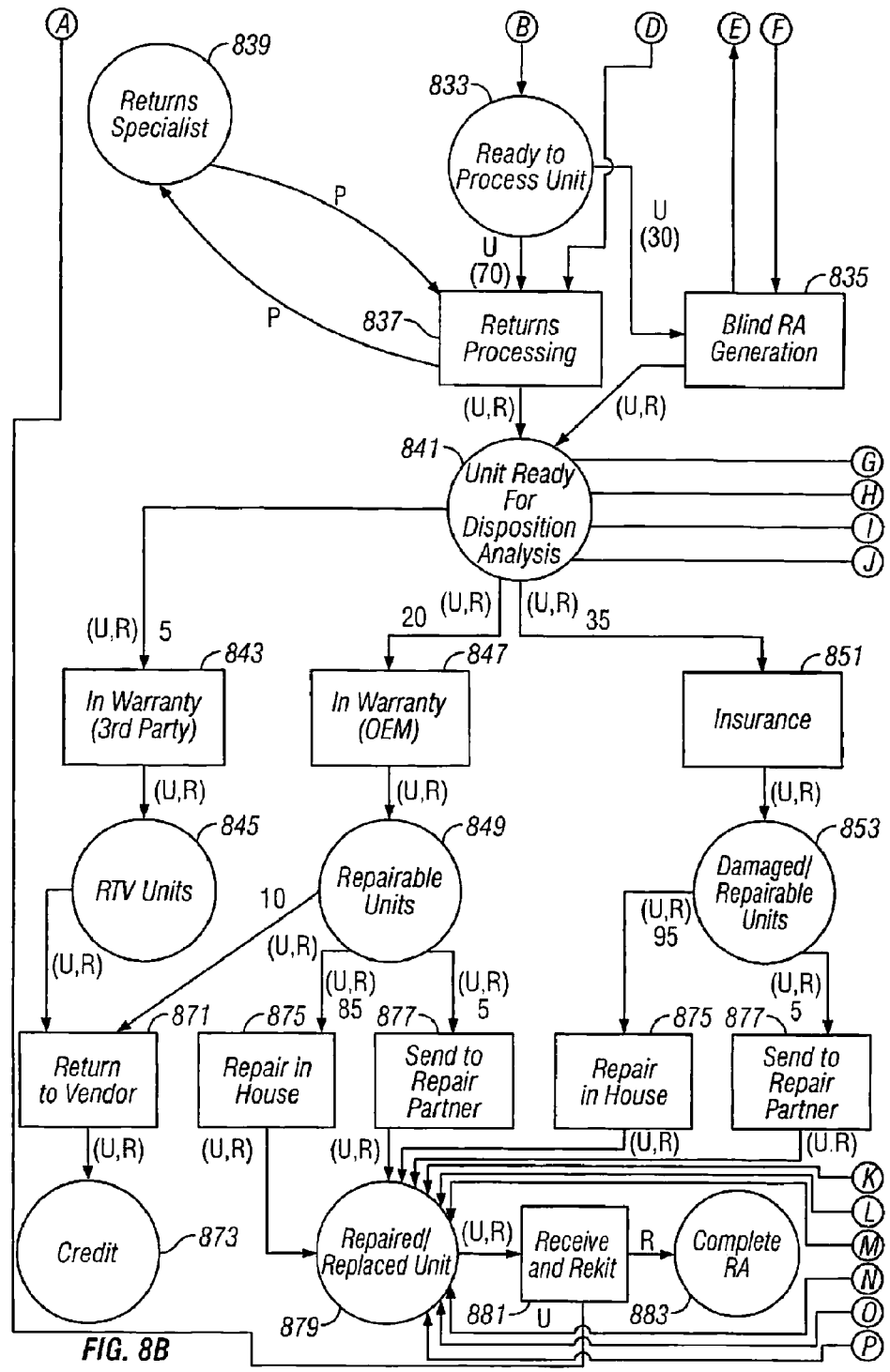
Figure 8C:
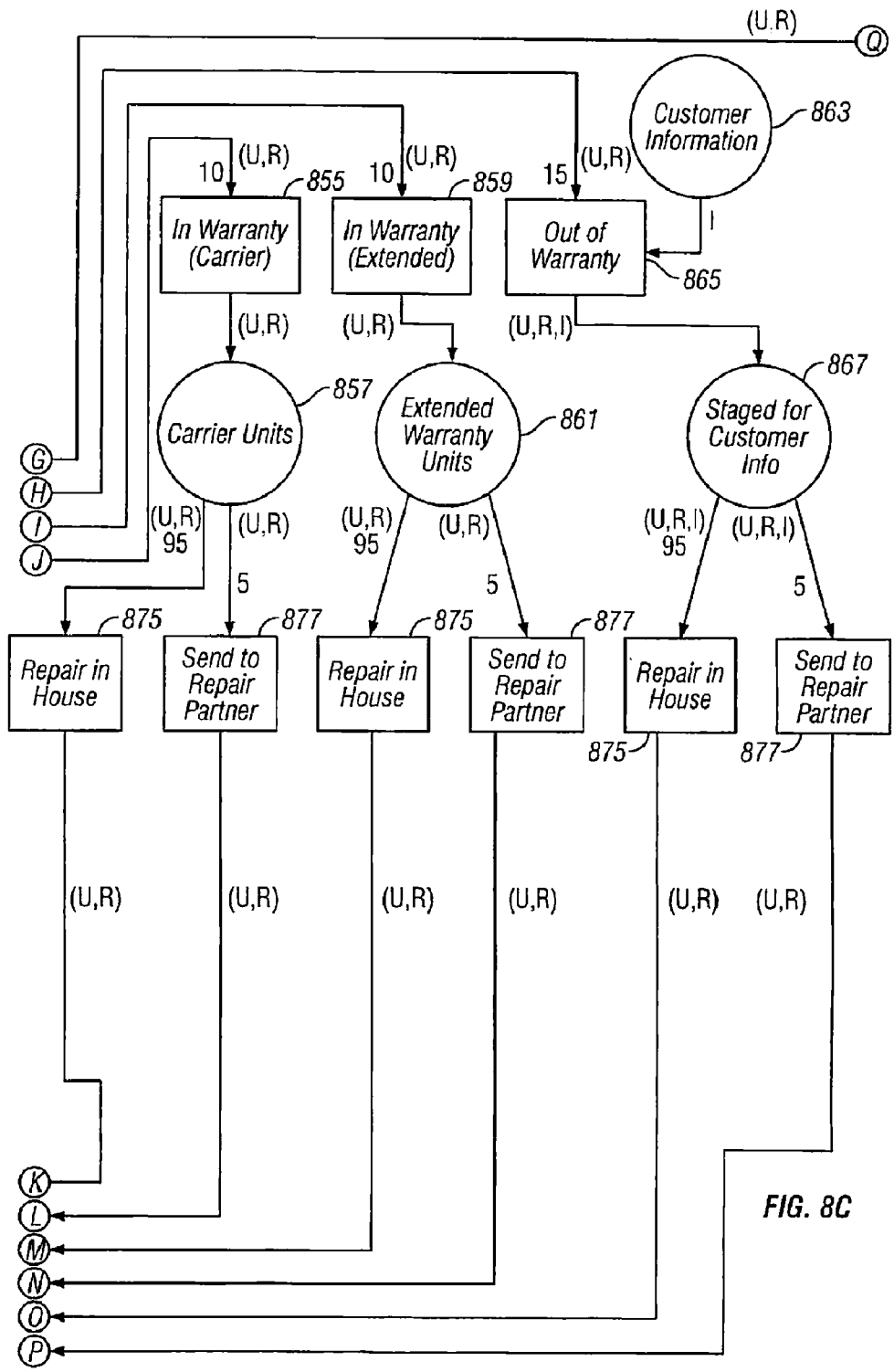

At state 801 in FIG. 8A, a return request has been received. State 801 then proceeds to generate a claim at 803 to transition to the claim state 805 for a standard return or state 823 for an advance exchange. For a standard return, the system generates a return authorization at transition 807, which is usually performed by a Customer Service Representative (CSR) at state 811. The system then transitions to state 809 to wait for the return. Once the return is received, the system process the return at transition 837 to result in state 841 where the returned product or unit is ready for returns disposition analysis, usually by a returns specialist at 839.

An alternate path can be taken starting with either a pre-prepared ready to ship Jiffy Pack at 821, or a pre-repaired unit in "B" Stock at 813, that is transitioned through advance exchange 823 where it is sent as a customer replacement in advance, and proceeding to the customer replacement state 825. At this point, the customer has received the replacement and must return the defective unit or product at transition 827 and the system will then be at state 829 with the defective unit or product in transit to the designated location. The product is then received at 831 where the system transitions to the state where it is ready to process the received unit at 833 in FIG. 8B. If the received unit already has a Return Authorization in the system, the process proceeds to Returns Processing at 837 followed by disposition analysis at 841. Disposition analysis is typically performed by a Returns Specialist 839. If the received unit or product does not have a Return Authorization (RA) in the system, the CSR 811 typically generates an RA at 835 and the system proceeds to disposition analysis at 841, usually performed by a Returns Specialist 839.

Once the product or unit is ready for disposition analysis at 841, there are multiple possible dispositions. In the area of mobile phones, the possible dispositions are typically In Warranty (Third Party Warranty) 843, In Warranty (Original Equipment Manufacturer or "OEM" Warranty) 847, In Warranty (Insurance) 851, In Warranty (Mobile Phone Carrier)

Figure 8D:
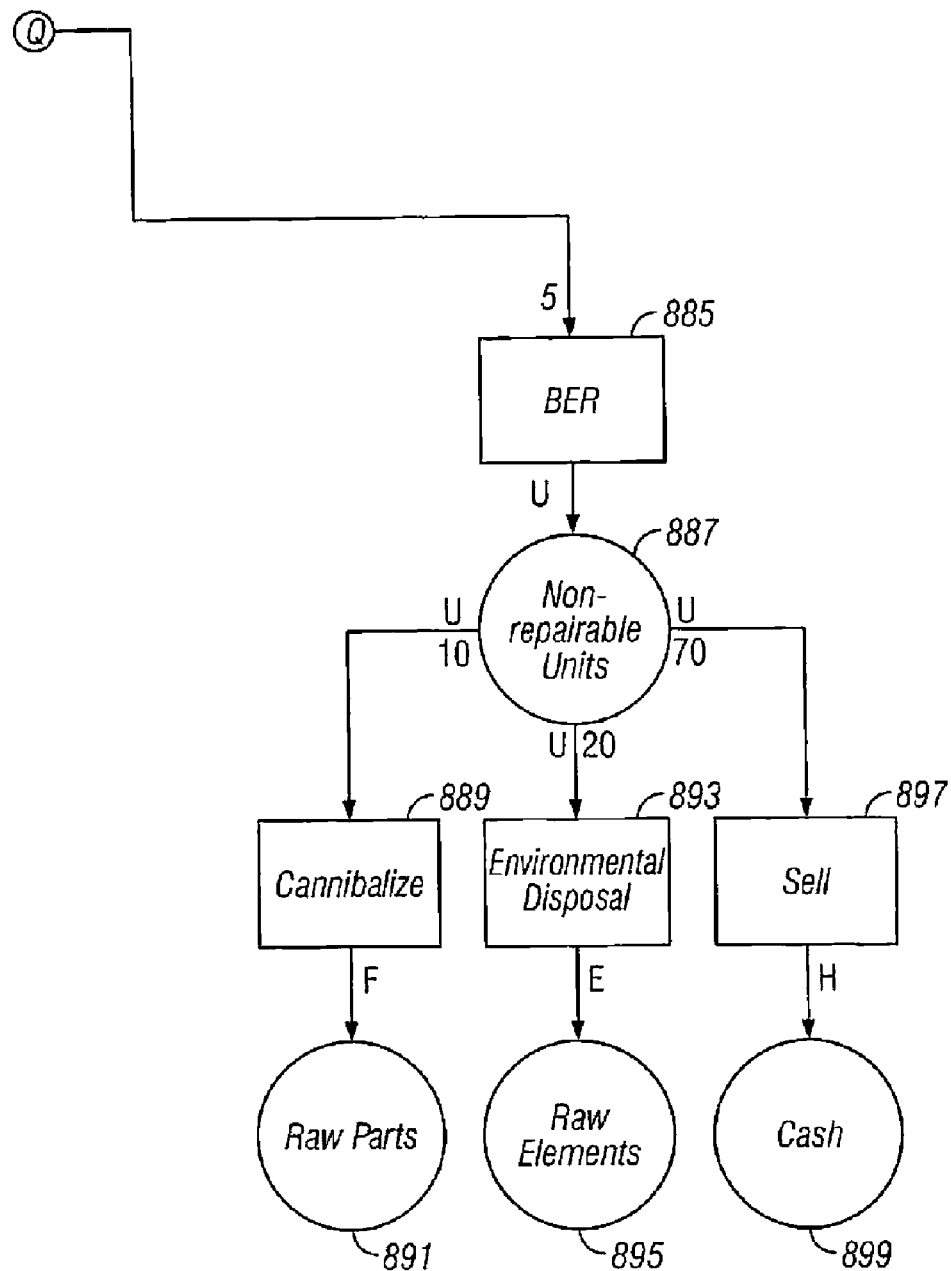

855 (see FIG. 8C), In Warranty (Extended Warranty) 859, Out of Warranty 865, or Beyond Economic Repair (BER) 885 (see FIG. 8D). If the disposition is out of warranty, the system typically needs customer information 863 before proceeding to repair the unit or return it to the customer. Each of these dispositions represents a transition where the product or unit transitions to the corresponding state. The state for each disposition, in their respective orders are Return to Vendor (RTV) Units 845, Repairable Units 849, Damaged/Repairable Units 853, Carrier Units 857 (see FIG. 8C), Extended Warranty Units 861, Staged for Customer Information 867, or Non-repairable units 887 (see FIG. 8D). Each returned product can be placed into one of the above categories for the system to proceed further with its processing. Once the product or unit is placed in the appropriate state, the remaining steps are very similar for each state.

If the product or unit is in the RTV Units state 845, the unit is returned to the vendor 871 and a credit is issued at 873. If the unit is in the Repairable Units state 849, the unit can be returned to the vendor 871 and a credit issued at 873, the unit can be repaired by the in-house 3PL at 875, or the unit can be repaired by an outside 3PL repair partner 3PL at 877. The remaining states including the Damaged/Repairable Units 853, Carrier Units 857 (see FIG. 8C), Extended Warranty Units 861, and the Staged for Customer Info 867 but not including the Non-Repairable Units 887 (see FIG. 8D), are either repaired by the in-house 3PL 875 or repaired by a 3PL repair partner 877. Once the proper repair transition 875,877 is completed, the units are in the Repaired/Replaced Unit state 879 until they undergo receive and rekit transition 881 where the repaired unit is sent to B Stock 813 and the RA is closed out at 883.

If the unit is Beyond Economic Repair (BER) 885 (see FIG. 8D) and classified in the non-repairable units state 887, the process is somewhat different than other classifications. A non-repairable unit has three possible transitions: cannibalization 889, environmentally safe disposal 893 or sale as salvage 897. The cannibalization for parts transition at 889 results in the raw parts state 891. The environmentally safe disposal transition at 893 results in the raw elements stage 895. The sale as salvage transition at 897 results in receiving cash at state 899.

Companies want to ensure that customers do not receive full credit for a return when there are missing components and only partial credit is due. In this event, the company's customers will want to know the specific missing components and associated pricing by serial number of the returned item.

Figure 9:
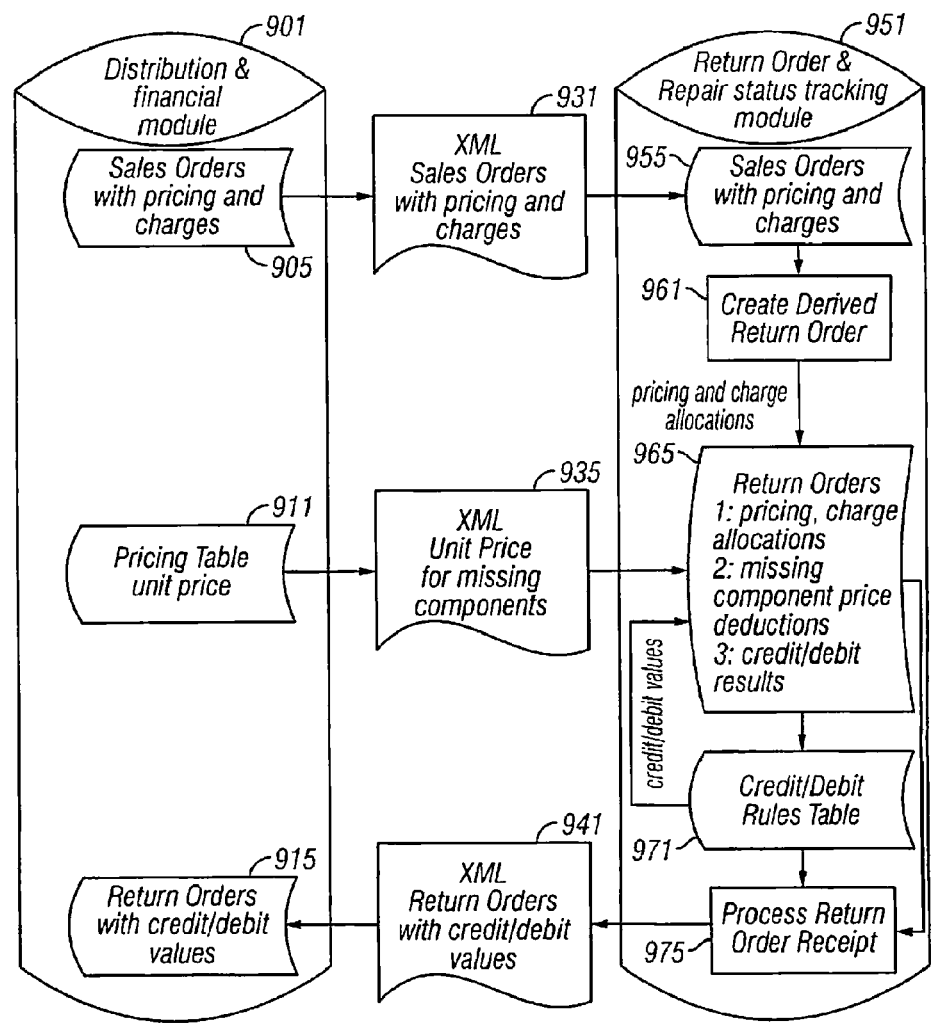
FIG. 9 is a flow diagram overview of the debit/credit rules in operation of one embodiment of the invention.

FIG. 9 contains an overview of how the debit/credit rules can function in one embodiment of the present invention. The distribution and financial module (DFM) 901 contains data such as sales order data 905 including pricing and charges, and pricing data table 911 including unit prices. The first step of the process involves the return order and repair status tracking module (RORST) 951 receiving sales order data 905 from the DFM 901. The request and/or data transfer can be done through XML or any other standard computer communication protocol that is desirable. The DFM 901 can convert the sales order data 905 to XML sales order data 931 for transmission to the RORST 951. The RORST 951 can receive the XML sales order data 931 and store it in the proper format for the RORST 951. The RORST 951 sales order data 955 can be used to create a derived return order at step 961 from the original sales order data 955. The created return order 965 can contain pricing and charge allocations, missing component price deductions, and/or credit/debit results.

In order for the component price reductions to be implemented in the RORST return order, the RORST must request the missing component unit prices from the DFM. When the RORST sends a request via a standard computer communication protocol, the DFM extracts the necessary data from the pricing table 911 and sends the XML unit price for missing components 935 to the RORST via a standard computer communication protocol.

Once the RORST receives the necessary missing unit price XML data 935, the system looks up the necessary information from the credit/debit rules table 971 in the RORST. These data are used to determine whether the amounts from the return should be debited or credited in the DFM. The debit/credit rules can make the overall reverse logistics system much more efficient by automating the debit/credit process so that it does not have to be performed by a returns processor. Once the return order 965 contains all the necessary information such as pricing and charge allocations, missing component price deductions (if applicable), and credit/debit results (if applicable), the system processes the return order receipt at 975. The RORST then sends the return order with debit/credit values 941 to the DFM via XML. The DFM receives these data and properly formats a return order with credit/debit values in the DFM. It is in the DFM where the debit/credits are preferably actually applied.

One embodiment of the invention enables this feature in the return order and repair status tracking (RORST) module. While the RORST module is one logical place to enable this feature, it can be placed within other modules of the system. Whenever the expected return quantity on a return order line is greater than one and there is an item being returned that has missing components, the returns processor can take action to ensure the expected return quantity on the original return order line is reduced by one piece, and that a new return order line for the applicable item/serial number is created.

The returns processor can then invoke the "missing components" action and identify the missing components and quantities. The RORST module can query either the distribution and financial module (DFM) for pricing and store the results as a discount in the RORST module (SKU and price or extended price if the quantity for a given SKU was greater than one). As an example, assume the return item below is a kit that normally contains a mobile phone, charger and two batteries. Upon inspection, it is determined one kit is missing a charger and a battery, and that a second kit is missing two batteries.

To minimize the number of DFM return orders that will be created, the Returns Processor can set aside the kits with missing components and continue to process the kits without missing components. The returns processor can then perform the "close receipt" action which can instruct the RORST module to publish and the DFM to create a return order for the kits without missing components. The Returns Processor would next go to the Return Details screen, select the applicable return order line, and invoke the "missing components" action. An example of how the operation of the debit/credit rules can handle missing components is depicted below.

In this example, the original return order in the RORST module is shown in Table 2 as follows:

TABLE 2

Sample Return Order from RORST module

| Order | Line | Line Type | Item | Description | Unit Price | Ret Qty | Srvc Fee | Frght | Ins |
|---|---|---|---|---|---|---|---|---|---|
| 00131 | 1 | R | 452700 | V550 Phone | 125.00 | 5 | .40 | 1.00 | .20 |

The RORST module return order can be modified as illustrated below in Table 3:

TABLE 3

Sample Modified Return Order from RORST module

| Order | Line | Line Type | Item | Description | Unit Price | Exp Qty | Ret Qty | Srvc Fee | Frght | Ins | MC-452702 | MC-452703 |
|---|---|---|---|---|---|---|---|---|---|---|---|---|
| 00131 | 1 | R | 452700 | V550 Phone | 125.00 | 4 | 3 | .32 | .80 | .16 | | |
| 00131 | 2 | R | 452700 | V550 Phone | 125.00 | 1 | 0 | .08 | .20 | .04 | | |

RORST can create a second line for 1 unit on the return order and reduce the expected return quantity by one unit on the original order line. Charge category values on line 1 are adjusted to 4/5 or 80% of the original values and charge values on line 2 are set to 1/5 or 20% of the original values of line 1.

Against the second line, the Returns Processor can then receive the fourth unit and then invoke the "missing components" action and identify the missing components and quantities for the fourth unit/serial number received. The RORST module return order can then appear as illustrated below in Table 4:

TABLE 4

Sample Modified Return Order from RORST module with partial credit applied

| Order | Line | Line Type | Item | Description | Unit Price | Exp Qty | Ret Qty | Srvc Fee | Frght | Ins | MC-452702 | MC-452703 |
|---|---|---|---|---|---|---|---|---|---|---|---|---|
| 00131 | 1 | R | 452700 | V550 Phone | 125.00 | 4 | 3 | .32 | .80 | .16 | | |
| 00131 | 2 | R | 452700 | V550 Phone | 125.00 | 1 | 1 | .08 | .20 | .04 | 15.00 | 5.00 |

Note:
Missing components can be captured as line charges. The charge category can be "discount" and the charge name can contain an indicator for missing components, the SKU and the quantity missing. In this example, there can be two charges with charge names as follows: MC/452702/1 for $15.00 and MC/452703/1 for $5.00.

The returns processor can next perform the "close receipt" action for the 1 unit on line 2 with missing components and instruct the RORST module to publish and the DFM to create a second return order for the 1 unit from line 2. The returns processor can go back to the Return Details screen, select return order line 1, and again invoke the "missing components" action. The RORST module return order can then be modified as illustrated below in Table 5:

TABLE 5

Sample Modified Return Order from RORST module with partial credit applied

| Order | Line | Line Type | Item | Description | Unit Price | Exp Qty | Ret Qty | Srvc Fee | Frght | Ins | MC-452702 | MC-452703 |
|---|---|---|---|---|---|---|---|---|---|---|---|---|
| 00131 | 1 | R | 452700 | V550 Phone | 125.00 | 3 | 3 | .24 | .60 | .12 | | |
| 00131 | 2 | R | 452700 | V550 Phone | 125.00 | 1 | 1 | .08 | .20 | .04 | 15.00 | 5.00 |
| 00131 | 3 | R | 452700 | V550 Phone | 125.00 | 1 | 0 | .08 | .20 | .04 | | |

The RORST module creates a third line for 1 unit on the return order and reduces the expected return quantity by one unit on the original order line. Charge category values on line 1 are adjusted to 3/5 or 60% of the original values and charge values on line 3 are set to 1/5 or 20% of the original values of line 1.

Against the third line, the Returns Processor can then receive the fifth unit, invoke the "missing components" action, identify the missing components and quantities for the fifth unit/serial number received and then perform the "close receipt" action. The RORST can format and publish a third DFM return order for the 1 unit from line 3. The final view of the RORST module return order using this approach is illustrated below in Table 6:

TABLE 6

Sample Modified Return Order from RORST module with partial credit applied

| Order | Line | Line Type | Item | Description | Unit Price | Exp Qty | Ret Qty | Srvc Fee | Frght | Ins | MC-452702 | MC-452703 |
|---|---|---|---|---|---|---|---|---|---|---|---|---|
| 00131 | 1 | R | 452700 | V550 Phone | 125.00 | 3 | 3 | .24 | .60 | .12 | | |
| 00131 | 2 | R | 452700 | V550 Phone | 125.00 | 1 | 1 | .08 | .20 | .04 | 15.00 | 5.00 |
| 00131 | 3 | R | 452700 | V550 Phone | 125.00 | 1 | 1 | .08 | .20 | .04 | | 10.00 |

The pricing and allocation of charges/discounts to RORST module sales orders and then derived return orders represent the values "potentially" available as a credit or debit to the customer. After processing on a derived return order is complete, whether for the entire return order or a partial receipt, the Returns Processor performs the "process receipts" action. When this occurs, the RORST module reads a custom Credit/Debit Rules table, and based on the combination of enterprise, return reason code and disposition code, it will determine which of the various charges and discounts on the derived return order should be credited or debited to the customer. Table 7 below shows the type of data that will be found in the Credit/Debit Rules table in the RORST module:

TABLE 7

Credit/Debit Rules Table

| Decision Variables | | | Shipped | Sales | Service | | COD | | | | |
|---|---|---|---|---|---|---|---|---|---|---|---|
| | Return Reason | Disposition | Unit | Tax | Fee | Freight | Deductible | Insurance | Discount | Rebate | |
| | | | Charge Line Types | | | | | | Discount Line Types | | |
| Enterprise | Code | Code | R | TX | H | F1 | CD | I | N1 | H |
| Enterprise 2 | R00 | ALL | C | C | C | C | D | C | D | D |
| Enterprise 2 | R01 | ALL | C | C | C | C | D | C | D | D |
| Enterprise 3 | WO | ALL | C | C | C | C | N | C | N | N |
| Enterprise 3 | WT | ALL | C | C | C | C | N | C | N | N |
| Enterprise 3 | WS | ALL | C | C | C | C | N | C | N | N |
| Enterprise 3 | DO | ALL | C | C | C | C | N | C | N | N |
| Enterprise 3 | RS | ALL | C | C | N | N | N | N | D | D |
| Enterprise 4 | RS | ALL | C | C | N | D | N | N | D | D |
| Enterprise 5 | RS | ALL | C | C | N | N | D | N | D | D |
| Enterprise 1 | RS | ALL | C | C | N | N | N | N | D | D |
| Enterprise 6 | RS | ALL | C | C | N | N | N | N | D | D |
| Enterprise 7 | RS | ALL | C | C | N | N | N | N | D | D |

Legend: C = apply credit, D = apply debit, N = no credit or debit applied

In the above Table 7, there can be up to three different return reason codes defined for a given return order line. The precedence rule is as follows (in pseudo code): 1) use the logistics integrator assigned return reason code at the return order line level; 2) else, use the customer return reason code at the return order line level; and 3) else, use the customer return reason code at the return order header level.

The specific rule set used as well as results can be stored in the RORST module. This information can be used to format and submit a return order to the DFM. The data exchange between the two modules can typically be XML, although any means of data exchange compatible with both modules can work equally as well. The resulting DFM return order can initiate an invoice with the applicable credits or debits due the customer. The Credit/Debit Rules table is typically not used for blind return orders (orders not derived from a sales order).

The specific rule set used to determine the credit or debit provided the customer, as well as the calculated results can be stored in the RORST module. After applying credit/debit rules and calculating the results, the information stored in the RORST module from the above example is illustrated in Table 8 below:

TABLE 8

Sample Information in RORST after applying Debit/Credit Rules

| Order | 00131 | 00131 | 00131 |
|---|---|---|---|
| Line | 1 | 2 | 3 |

TABLE 8-continued

Sample Information in RORST after applying Debit/Credit Rules

| Credit/Debit Rule Set Used | | | |
|---|---|---|---|
| Return Reason Code | R01 | R01 | R01 |
| Disposition Code | TX | TX | TX |
| R_Charge_Code | C | C | C |
| TX_Charge_Code (Sales Tax) | C | C | C |
| H_Charge_Code | C | C | C |
| F1_ChargeCode | C | C | C |
| CD_Charge_Code | C | C | C |
| I_Charge_Code | C | C | C |
| N1_Discount_Code | D | D | D |
| H_Discount_Code | D | D | D |
| Credit/debit to Customer Results | | | |
| Unit_Price_Credit | 125.00 | 105.00 | 115.00 |
| TX_Charge_Credit (Sales Tax) | .00 | .00 | .00 |
| H_Charge_Credit | .24 | .08 | .08 |

TABLE 8-continued

| Sample Information in RORST after applying Debit/Credit Rules | | | |
|---|---|---|---|
| F1_Charge_Credit | .60 | .20 | .20 |
| F1_Charge_Debit | .00 | .00 | .00 |
| CD_Charge_Credit | .00 | .00 | .00 |
| I_Charge_Credit | .12 | .04 | .04 |
| N1_Discount_Debit | .00 | .00 | .00 |
| H_Rebate_Debit | .00 | .00 | .00 |

After processing on a return order is complete, whether for the entire return order or a partial receipt, and the Returns Processor performs the "process receipts" action, the final step is that the extended RORST module can use the information illustrated in the prior sections, to format and then submit a return order to the DFM. Each DFM return order created can initiate an invoice with the applicable credits or debits due the customer.

The following examples in Tables 9-12 illustrate the return order data that can be sent to the DFM.

TABLE 9

Sample RORST Module Return Order 1

| Order | Line | Line Type | Item | Description | Unit Price | Ret Qty | Sales Tax | Srvc Fee | Frght | COD Ded | Ins |
|---|---|---|---|---|---|---|---|---|---|---|---|
| 00105 | 1 | R | 452700 | V550 Phone | 125.00 | 25 | 1.56 | 1.25 | 4.38 | 6.25 | .63 |

TABLE 10

Sample RORST Module Return Order 2

| Order | Line | Line Type | Item | Description | Unit Price | Ret Qty | Sales Tax | Srvc Fee | Frght | COD Ded | Ins |
|---|---|---|---|---|---|---|---|---|---|---|---|
| 00121 | 1 | R | 452700 | V550 Phone | 125.00 | 5 | .31 | .25 | .88 | 1.25 | .13 |

TABLE 11

Sample DFM Return Order
(from 1st RORST Module return order #00105)

| Order | Line | Line Type | Item | Description | Unit Price | Qty |
|---|---|---|---|---|---|---|
| 22699 | 1.000 | R | 452700 | V550 Phone | −125.00 | 25 |
| 22699 | 2.000 | TX | 900101 | Sales Tax | −1.56 | 1 |
| 22699 | 3.000 | CD | 900122 | COD Ded | 6.25 | 1 |

When formatting charges and discounts lines, with the exception of rebates (line type = H) and discounts (line type = N1 and charge name = Discount), a single line can be formatted and the total value of charges and discounts from one or more RORST module return order lines can be used as the unit price. When formatted for the DFM, the unit price for credits can be a negative value and the unit price for debits can be a positive value. Also notice that per the credit/debit table, no credit or debit is provided for service fees, freight or insurance for certain enterprises.

TABLE 12

Sample DFM Return Order
(from 2nd RORST Module return order #00121)

| Order | Line | Line Type | Item | Description | Unit Price | Qty |
|---|---|---|---|---|---|---|
| 22703 | 1.000 | R | 452700 | V550 Phone | −125.00 | 5 |
| 22703 | 2.000 | TX | 900101 | Sales Tax | −.31 | 1 |
| 22703 | 3.000 | CD | 900122 | COD Ded | 1.25 | 1 |

While the invention is described above in reference to specific examples and embodiments, the metes and bounds of the invention are not to be limited by the foregoing disclosure, which is illustrative only, but should be determined in accordance with the full scope and spirit of the appended claims.

What is claimed is:

1. A reverse logistics management system for automating different business rules and controls used by processors and agents of a logistics integrator for a plurality of customers and makes and models, for automating inbound and outbound tracking at the order, order line, and serialized unit level, and for providing results, cost and component visibility and service level and performance metrics through reports and client interfaces, comprising:

a return order and repair order status tracking module for processing and tracking a returned product wherein the processing includes inspecting the returned product according to an applicable set of inspection criteria selected from a database of inspection criteria sets to service a plurality of customers and product types with a plurality of processing rules, wherein the return order and repair order status tracking module is configured to automatically determine disposition of the returned product based on inspecting the returned product and based on if the returned product (i) is under warranty, (ii) includes insurance, and (iii) is beyond economic repair;

a repair order module in communication with the return order and repair order status tracking module for facilitating repair and maintaining a repair status database by order, order line and unit;

a distribution and financial module in communication with the return order and repair order status tracking module and the repair order module for processing accounting entries for a plurality of customers according to a plurality of corresponding business rules; and a data repository and reporting module in communication with one or more of the return order and repair order status tracking module, the repair order module, and the distribution and financial module, operated by the logistics integrator to extract, consolidate and report transaction metrics and event data internally and externally to support process management, claims verification and billing, wherein the logistics integrator comprises a fourth-party logistics enterprise configured to integrate and process information from a plurality of third-party logistics providers.

2. The system of claim 1 comprising inspection criteria from an item master database entry overriding the inspection criteria from the database of inspection criteria.

3. The system of claim 1 wherein the return order and repair order status tracking module further includes maintaining a status database by order, order line and unit.

4. The system of claim 1 wherein the return order and repair status tracking module further includes debit/credit rules for automatically applying appropriate debits or credits to return orders in the distribution and financial module.

5. The system of claim 1 wherein the distribution and financial module further includes transaction processing for sales orders and invoices and for managing inventory data for a plurality of customers and reverse logistics processes.

6. The system of claim 1, wherein the return order and repair order status tracking module further comprises sub-modules for sales order inquiry, return for credit, return for exchange, undeliverable/refused, return not shipped from customer, return disposition, inventory receipt, return authorization order inquiry, electronic serial number inquiry, item inquiry, return authorization hold for credit validation, return to sender, repair order status tracking, and combinations thereof.

7. The system of claim 1, wherein the repair order module further comprises submodules for repair orders, capture of key repair information required by customers, repair order status and disposition data, and combinations thereof.

8. The system of claim 1, wherein the distribution and financial module further comprises sub-modules for sales order processing, inventory management, procurement, customer history, financial accounting, customer credit, price adjustment, and combinations thereof.

9. The system of claim 1, wherein the distribution and financial module communicates to the return order and repair order status tracking module information selected from the group consisting of created and updated item information, created and updated shipping information, sales order information, created and updated customer information, and combinations thereof.

10. The system of claim 1, wherein the return order and repair order status tracking module is in communication with the repair order module to create repair orders and update status and disposition data of returns.

11. The system of claim 1, wherein the repair order module is in communication with the distribution and financial module to create sales orders and line items.

12. The system of claim 1 wherein the logistics integrator coordinates the system based on a product serial number, a return authorization number, or a combination thereof.

13. The system of claim 1, wherein the system comprises a participant model comprising a hub and a plurality of enterprises.

14. The system of claim 13, wherein the enterprises comprise sub-groups selected from buyer, seller, carrier, and combinations thereof.

15. The system of claim 1, wherein the return order and repair order status tracking module arranges to return the returned product to a vendor if the returned product includes a third party warranty.

16. The system of claim 1, wherein the return order and repair order status tracking module arranges to repair the returned product in an in-house repair facility or at a third-party logistics outside repair partner if the returned product is deemed to be repairable and the returned product is covered by insurance.

17. The system of claim 1, wherein the return order and repair order status tracking module arranges for one of cannibalizing, environmental disposal, and selling of the returned product if the returned product is deemed as being beyond economic repair.

18. A method of reverse logistics management for automating different business rules and controls used by processors and agents of a logistics integrator for a plurality of customers and makes and models, for automating inbound and outbound tracking at the order, order line, and serialized unit level, and for providing results, cost and component visibility and service level and performance metrics through reports and client interfaces, comprising:
  operating a logistics integrator to maintain data of a reverse logistics management system, wherein the logistics integrator is a fourth-party logistics enterprise configured to integrate and process information from a plurality of third-party logistics providers;
  creating automated business rules for determining disposition of a repaired product and generating repaired device instructions to service a plurality of customers and product types using a plurality of said automated business rules, wherein the disposition of the returned product is automatically determined based on inspecting the returned product and based on if the returned product (i) is under warranty, (ii) includes insurance, and (iii) is beyond economic repair;
  creating a return order in the returns management system based on a product serial number;
  providing instructions to the returning party in accordance with the return order;
  publishing return order data and repaired product instructions from the returns management system to a third-party logistics provider's database;
  publishing sales order and item master data to a sales order database and a return and repair order status database;
  receiving the returned product;
  validating that the return contents match the return order data;
  inspecting the returned product according to an applicable set of inspection criteria selected from a plurality of inspection criteria sets, wherein the plurality of inspection criteria sets are provided from the return and repair order status database, a third party, a database of inspection criteria, item master, or a combination thereof; and
  receiving status updates from the third-party logistics provider's database.

19. The method of claim 18, further comprising tracking the return orders.

20. The method of claim 19, wherein the repair order tracking comprises:
  inspecting the return according to an applicable set of inspection criteria selected from a database of inspection criteria sets to service a plurality of customers and product types with a plurality of processing rules;
  creating the repair order in the repair order module;
  publishing the repair order to the repair order module;
  entering actions performed on the return;
  updating status or disposition of the repair order; publishing the updated status or disposition of the repair order;
  shipping the repair; and
  closing the repair order.

21. The method of claim 20, wherein the repair order status or disposition updating is automatically performed by the repair order module.

22. The method of claim 20, wherein the repair order status or disposition updating is performed manually.

23. The method of claim 20, wherein the inspection rules are provided from the return order and repair order status module, a third-party, the repair order module, a database of inspection criteria, item master or a combination thereof.

24. The method of claim 18, wherein the inspection comprises receiving the return and comparing the contents of the return received with applicable descriptions according to inspection rules maintained in the system by the logistics integrator to classify the returned product based on its enterprise and make/model.

25. The method of claim 18 wherein the fourth-party logistics enterprise receives the returned product directly from the returning party and forwards the returned product to one of the plurality of third-party logistics providers' repair facilities.

26. The method of claim 18, wherein the returns management system comprises:
a return order and repair order status module for processing and tracking the return orders; a repair order module in communication with the return order and repair order status module for facilitating the repair and gathering and storing repair data;
a distribution and financial module in communication with the return order and repair order status module and the repair order module for facilitating the sales order and inventory data; and
a data repository and reporting module in communication with one or more of the other modules in the returns management system operated by the logistics integrator to extract, consolidate and report transaction metrics and event data internally and externally to support process management, claims verification and billing, wherein the logistics integrator coordinates the returns management system.

27. The method of claim 26, wherein the return processing comprises:
selecting one of the return orders to process; presenting applicable descriptions and inspection rules matching an enterprise, make and model of the return;
entering applicable data regarding the return into the system;
sending information regarding action to take regarding the return;
taking action regarding the return according to the information sent;
creating a repair order for the return;
decrementing inventory utilizing the return order and repair order status module;
processing debit/credit information via the return order and repair status tracking module and the debit/credit rules contained therein;
transferring calculated debit/credit information from the return order and repair status tracking module to the distribution and financial module; and
updating the inventory database via the distribution and financial module.

28. The method of claim 27, wherein the applicable data entered comprise quantity received, reason, disposition, prior repairs, or a combination thereof.

29. The method of claim 27, wherein the information sent regarding action to take comprises an alert to create a sales order for shipping and handling charges, serial number and return information to the distribution and financial module; an alert to create a debit memo in the distribution and financial module for restocking fee; an alert to perform price adjustment in the distribution and financial module; an alert to create a sales order in the sales order module for exchanging the return; or a combination thereof.

30. The method of claim 27, further comprising updating the electronic serial number via the distribution and financial module after the inventory is updated.

31. The method of claim 18 wherein the returning party sends the returned product directly to one of the plurality of third-party logistics providers.

32. The method of claim 31 wherein the contents validation and inspection is performed by a third-party logistics supplier or vendor.

33. The method of claim 32 wherein the third-party logistics provider returns the repaired product to the returning party.

34. The method of claim 32 wherein the third-party logistics provider returns the repaired product to the fourth-party logistics enterprise's inventory.

35. The method of claim 18, wherein the return order creation comprises:
receiving a request for a return;
searching for an associated sales order;
retrieving data from any associated sales order;
creating a return order for the requested return from a predefined template;
presenting any applicable descriptions and inspection rules from the returns management system that match the particular returned device based on make, model, or client; entering any specific return data; and
saving the return order.

36. The method of claim 35, wherein the request is received from a source by email, telephone, fax, electronic submission, personal presentation, receiving a return, mail, or a combination thereof.

37. The method of claim 35, wherein associated sales orders are searched by electronic serial number, mobile identification number, sales order number, billable stamp, order, order line, unit or a combination thereof.

38. The system of claim 18, wherein the disposition of the returned product includes arranging for return of the returned product to a vendor if the returned product includes a third party warranty.

39. The system of claim 18, wherein the disposition of the returned product includes arranging for repair of the returned product in an in-house repair facility or at a third-party logistics outside repair partner if the returned product is deemed to be repairable and the returned product is covered by insurance.

40. The system of claim 18, wherein the disposition of the returned product includes arranging for one of cannibalizing, environmental disposal, and selling of the returned product if the returned product is deemed as being beyond economic repair.

* * * * *